(12) United States Patent
Yoon et al.

(10) Patent No.: US 8,192,516 B2
(45) Date of Patent: Jun. 5, 2012

(54) FILTER CASSETTE MAGAZINE AND APPARATUS FOR SEQUENTIALLY GATHERING FINE PARTICLES USING THE SAME

(75) Inventors: Gwan Hoon Yoon, Paju-si (KR); Won Sik Chae, Incheon (KR)

(73) Assignee: APM Engineering Co., Ltd., Bucheon-Si, Kyunggi-Do (KR)

( * ) Notice: Subject to any disclaimer, the term of this patent is extended or adjusted under 35 U.S.C. 154(b) by 373 days.

(21) Appl. No.: 12/698,767

(22) Filed: Feb. 2, 2010

(65) Prior Publication Data
US 2010/0288128 A1    Nov. 18, 2010

(30) Foreign Application Priority Data

May 13, 2009 (KR) .................. 10-2009-0041712

(51) Int. Cl.
*B01D 46/00* (2006.01)
(52) U.S. Cl. ............. 55/353; 95/26; 96/413; 96/423; 96/429; 221/268; 221/306
(58) Field of Classification Search ............ 55/351, 55/353, 494; 95/26, 277; 96/398, 413, 423, 96/429; 221/66, 197, 209, 258, 268, 269, 221/303, 306
See application file for complete search history.

(56) References Cited

U.S. PATENT DOCUMENTS 7,186,290 B2 * 3/2007 Sheehan et al. ............ 95/277
7,399,337 B2 * 7/2008 Rodgers ..................... 95/25

FOREIGN PATENT DOCUMENTS

KR    10-0825933    *    4/2008

OTHER PUBLICATIONS

Machine translation of KR 10-0825933, published Apr. 22, 2008.*

* cited by examiner

*Primary Examiner* — Robert Clemente
(74) *Attorney, Agent, or Firm* — The PL Law Group, PLLC

(57) ABSTRACT

Disclosed is a filter cassette magazine and an apparatus for sequentially gathering fine particles using the same, in which a 'filter cassette not having gathered fine particles yet,' is received from a first magazine and the received filter cassette is transferred to a lower portion of an upper filter holder, the 'filter cassette not having gather fine particles yet' is pushed up toward the upper filter holder by lifting a lower filter holder so as to gather fine particles from outside, the 'filter cassette having gathered fine particles' is transferred to a lower portion of a second magazine, and the 'filter cassette having gathered fine particles' is pushed up and stored into the second magazine by lifting a push rod. Therefore, it is possible to implement simple maintenance and management, reduction in malfunction, and reduction in parts for machines and equipment.

36 Claims, 22 Drawing Sheets

FILTER CASSETTE MAGAZINE AND APPARATUS FOR SEQUENTIALLY GATHERING FINE PARTICLES USING THE SAME

CROSS-REFERENCE TO RELATED APPLICATIONS

This application claims the benefit of Korean Patent Application No. 10-2009-0041712 filed with the Korea Intellectual Property Office on May 13, 2009, the disclosure of which is incorporated herein by reference.

BACKGROUND OF THE INVENTION

1. Field of the Invention

The present invention relates to a filter cassette magazine and an apparatus for sequentially gathering fine particles using the same; and, more particularly, to a filter cassette magazine for gathering fine particles which is simply structured to thereby implement horizontal and vertical movement, and an apparatus for sequentially gathering fine particles using the same.

2. Description of the Related Art

Air pollution has recently emerged as a serious problem due to an increasing amount of energy obtained by fossil fuels, an increasing amount of incineration for industrial waste or municipal waste, and exhaust gas smoking from automobiles.

Since gas produced by incineration of fossil fuels, industrial waste, municipal waste, or the like contains a wide variety of toxic substances, such substances are released to the air to thereby have ill effects on the human body. The toxic substances include gas containing halogen compounds like HCl, NOX, $SO_2$, CO, HF, combustion gas like ammonia, and so on.

Various researches and experiments show that if the toxic substances are absorbed and accumulated in the human body, they not only cause a variety of illnesses, but also adversely affect nature environment.

Therefore, the need for management of the fine particles containing the toxic substances is being emphasized. As a way of managing them, facilities all over the world have been given restrictions on amounts of toxic substance emission under the law.

Also in Korea, notification of the Minister of Environment appears restriction on an amount of toxic substances emission contained in exhaust gas. To this end, the Minister of Environment manages and directs the content for toxic substances in exhaust gas through the notification ('testing method for air pollution processes,' and 'testing methods for allowable exhaust standard,' and so on).

At this time, in order to measure an amount of toxic substance emission, it is necessary to gather fine particles and ultra fine particles contained in the air. For this, research and development have been conducted on an apparatus for sequentially gathering fine particles and ultra fine particles.

This applicant has disclosed "fine particle and ultra fine particle sampling filter cassette sequential exchanging unit" (Korean Patent No. 10-0825933, published on Apr. 29, 2008).

In the prior art, although two filter cassettes can be sequentially transferred using one source of power (e.g. motor, driving gear), this source of power is covered with dust. Therefore, the use of power's source causes frequently malfunctions.

In addition, it is complicated to form a structure in which a filter cassette slider and a lower slider are horizontally transferred, and a structure in which a lower filter holder and a push rod are lifted in conjunction with the horizontal movement of the lower slider. It spends a lot of manufacturing costs due to an increase in the number of parts.

Moreover, in the prior art, if malfunction occurs as two filter cassettes are sequentially transferred, two samples used for gathering fine particles are discarded.

Furthermore, the prior art has problems in that since it is impossible to identify where two filter cassettes are located, mechanical operation desired by users fails to be provided.

Furthermore, the prior art has disadvantages in that an upper mounting plate is disassembled through a tool at the time of performing internal check, repair, and maintenance of the apparatus.

SUMMARY OF THE INVENTION

The present invention has been proposed in order to overcome the above-described problems and it is, therefore, an object of the present invention to provide an apparatus for gathering fine particles in which it is possible to reduce defects of operation and to facilitate internal repair, management, and maintenance of the apparatus.

Further, another object of the present invention is to provide an apparatus for gathering fine particles, which can reduce the number of parts, and thus reduce manufacturing costs.

Further, another object of the present invention is to provide an apparatus for gathering fine particles in which it is possible to accurately sense where a filter cassette is located, thereby implementing the precise control in moving a transfer slide.

Further, another object of the present invention is to provide an apparatus for gathering fine particles for sequentially performing all processes in which one filter cassette is moved to gather fine particles, and the gathered fine particles are stored in a separate magazine.

Other purposes and advantages of the present invention can be understood by the following description, and can be more clear by embodiments of the present invention. Also, the purposes and advantages of the present invention can be realized by means and combination thereof defined in the scope thereof.

In accordance with one aspect of the present invention to achieve the object, there is provided an apparatus for sequentially gathering fine particles including: a first magazine for storing a filter cassette not having gathered fine particles yet; a second magazine for storing a filter cassette having gathered fine particles; an upper mounting means formed with a first mounting groove and a second mounting groove which mount each of the first magazine and the second magazine, and a covering part on which an upper filter holder is mounted, the upper filter holder being interposed between the first mounting groove and the second mounting groove and gathering fine particles from the outside; a horizontal transfer means formed at a lower portion of the upper mounting means, the horizontal transfer means receiving the 'filter cassette not having gathered fine particles' from the first magazine and horizontally moving the received filter cassette to the upper filter holder so as to gather fine particles, and horizontally moving the 'filter cassette having gathered fine particles' to a lower portion of the second magazine; and a vertical transfer means formed at a lower portion of the horizontal transfer means, the vertical transfer means pushing up the 'filter cassette not having gathered fine particles,' which has been horizontally moved to the upper filter holder, in such a manner to come into close contact with the upper filter holder, and pushing up and charging the 'filter cassette having gathered fine particles,' which has been horizontally moved to the lower portion of the second magazine, into the second magazine.

In this case, first and second filter cassette magazines for receiving filter cassettes which gather fine particles include: a body part for storing the filter cassettes; a lid insertion-coupled to an upper end of the body part; a filter cassette holding part having a first stopping projection which is formed on an inner peripheral surface of an upper end thereof in such a manner that the lower end of the body part is inserted and coupled thereto, a plurality of through holes formed on a lower end thereof, and supporting beads inserted into the through holes, the supporting beads supporting the filter cassettes; a bearing formed on an outer peripheral surface of the lower end of the filter cassettes where the through holes are formed; and a mounting part having a second stopping projection formed on an inner peripheral surface thereof so as to seat the bearing, and a stopping part formed on an outer peripheral surface thereof due to step, the mounting part being coupled to be moved up and down in the lower end of the filter cassette holding part.

Also, the through holes of the filter cassette holding part are formed in a cross direction.

Also, the bearing has a lower end formed to be inclined upwardly to the inside thereof.

Also, when the mounting part is moved upwardly, the bearing seated in the second stopping projection is lifted along a first space formed between the mounting part and the filter cassette holding part, the supporting beads are pushed toward a second space formed between the mounting part and the through holes, and then the filter cassettes are dropped due to upward movement of the mounting part.

Also, when the filter cassettes are pushed from the lower portion of the magazine and stored into the magazine, the filter cassettes pushed up toward the inside of the magazine push the supporting beads to the outside of the through holes while the bearing is lifted to the first space formed between the mounting part and the filter cassette holding part, and the bearing is lowered from the first space while pushing the supporting beads toward the inside of the through holes again and thus the filter cassettes are supported and stored by the supporting beads when the filter cassettes are lifted after passing by the through holes.

Also, the first mounting groove and the second mounting groove are additionally formed with magazine mounting-releasing buttons used for mounting and releasing the first magazine and the second magazine, respectively.

Also, the upper mounting means further includes a base which is coupled to the lower portion of the covering part such that the covering part can be hinged.

Also, the horizontal transfer means includes: a filter cassette transfer slide for receiving the 'filter cassette not having gathered fine particles' from the first magazine and transferring the received filter cassette to a lower portion of the upper filter holder, and transferring the 'filter cassette with the gathered fine particles' to a lower portion of the second magazine; a time belt for horizontally moving the filter cassette transfer slide; first and second guide rails and 332 for guiding horizontal movement of the filter cassette transfer slide in both sides of the filter cassette transfer slide; and a first motor for driving the time belt.

Also, the horizontal transfer means further includes a location sensing unit for sensing where the filter cassette transfer slide is located, and it identifies a location of the filter cassette transfer slide, and controls precise movement while moving the filter cassette transfer slide in right and left so that the 'filter cassette not having gathered fine particles' are accurately located at a lower portion of the upper filter holder.

Also, the horizontal transfer means further includes an impact-absorbing bar which is formed above the first and second guide rails in such a manner to be parallel to the first and second guide rails with respect to the filter cassette transfer slide interposed therebetween.

Also, the vertical transfer means includes: a lower filter holder for pushing up the 'filter cassette not having gathered fine particles,' which is positioned at a lower portion of the upper filter holder, in such a manner to come into close contact with the upper filter holder; a push rod for pushing up and charging the 'filter cassette having gathered fine particles,' which is positioned at a lower portion of the second magazine, into the second magazine; a lifting means for lifting the lower filter holder and the push rod; and a second motor for driving the lifting means, wherein the second motor is mounted on one surface of a motor mounting part formed at a lower surface of the horizontal transfer means.

Also, the lifting means includes: a rotary member connected to the second motor on the other surface of the motor mounting part, the rotary rotating while being driven by the second motor; a pair of translation members connected to the rotary member in such a manner to change the rotation movement of the rotary member into the translation movement, the translation members being formed to be parallel to each other with respect to the lower filter holder interposed therebetween; a pair of first lifting members, each of which has one end connected to each of the translation members and the other end connected to the lower filter holder, the first lifting member lifting the lower filter holder according to the translation movement of the translation members; and a pair of second lifting members, each of which has one side connected to each of the translation members, another side connected to the bracket, and the other side connected to the push rod, the second lifting member lifting the push rod according to the translation movement of the translation members.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Hereinafter, preferred embodiments of a filter cassette and an apparatus for gathering fine particles using the same in the present invention will be described with reference to FIGS. 1 to 11. The following drawings and description are associated with preferred embodiments from among various embodiments for effective explanation of the present invention, and the present invention is not limited by them.

In the following description of the present invention, a detailed description of known functions and configuration incorporated herein will be omitted when it may make the subject matter of the present invention rather unclear. Terms which will be later are defined on the basis of the entire contents of the present specification.

First, the term "fine particle" used in the specification of the present invention refers to PM 10 (Particle Matters 10 μm), and the term "ultra fine particles" refers to PM 2.5 (Particle Matters 2.5 μm) under the environmental protection law. Hereinafter, the fine particle and the ultra fine particles are referred to as 'fine particles,' for description convenience.

Figure 1:
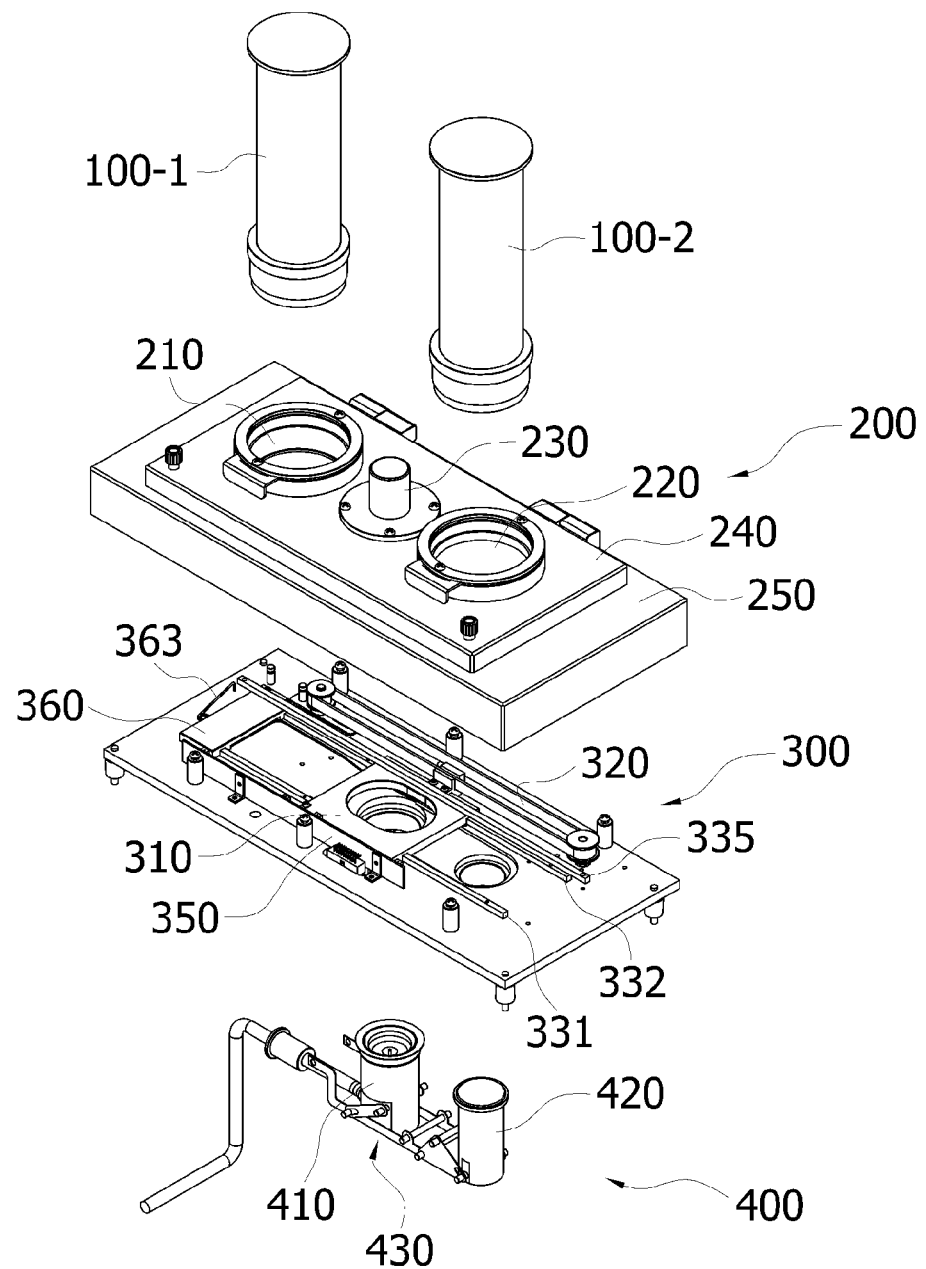
FIG. 1 shows an exploded perspective view of an illustrative embodiment of an apparatus for sequentially gathering fine particles.
Figure 2:
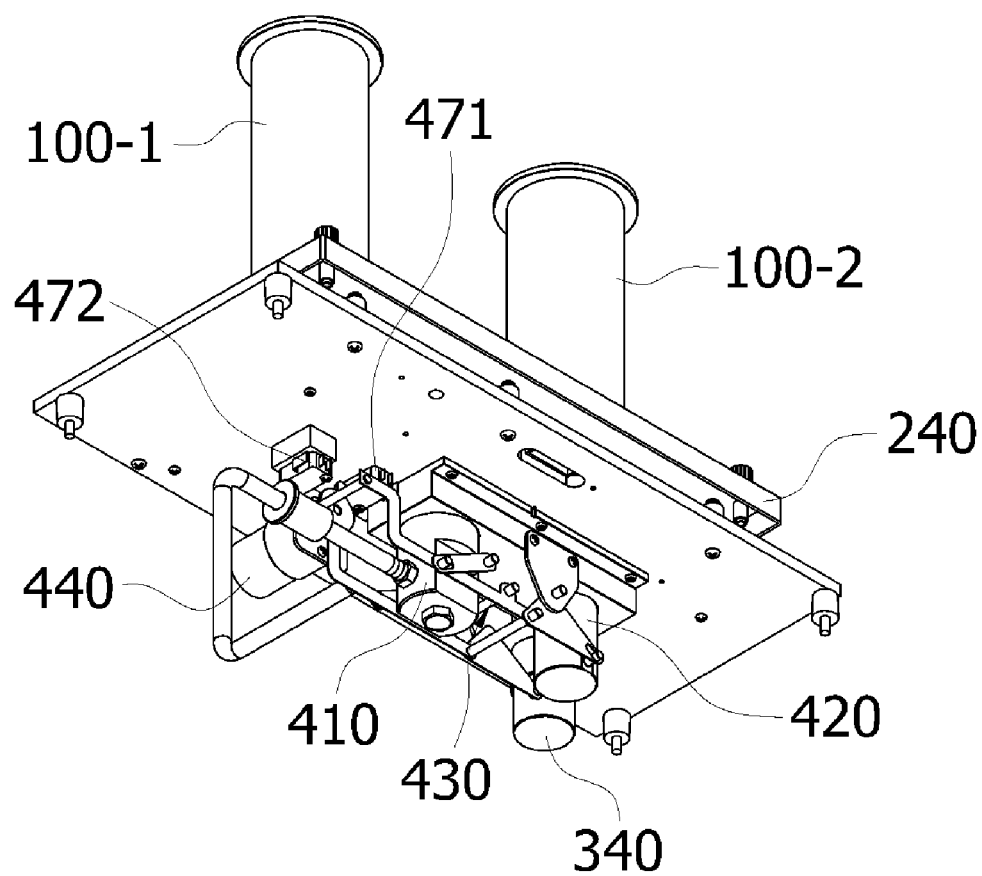
FIG. 2 shows a bottom perspective view of an illustrative embodiment of an apparatus for sequentially gathering fine particles.

FIG. 1 shows an exploded perspective view of an illustrative embodiment of an apparatus for sequentially gathering fine particles. FIG. 2 shows a bottom perspective view of an illustrative embodiment of an apparatus for sequentially gathering fine particles.

Referring to FIGS. 1 and 2, the apparatus for sequentially gathering fine particles includes a first magazine 100-1 for storing a filter cassette which has not gathered fine particles yet, a second magazine 100-2 for storing a filter cassette which has gathered fine particles, an upper mounting means 200, a horizontal transfer means 300, and a vertical transfer means 400. Hereinafter, a filter cassette not having gathered fine particles yet is referred to as 'C1' and a filter cassette having gathered fine particles is referred to as 'C2'.

The upper mounting means 200 includes a first mounting groove 210 and a second mounting groove 220, a covering part 240, and a base 250. The first mounting groove 210 and the second mounting groove 220 to mount the first magazine 100-1 and the second magazine 100-2 are formed to be spaced apart from each other. The covering part 240 has the upper filter holder 230 interposed between the first mounting groove 210 and the second mounting groove 220 and gathers fine particles from the outside. At the lower portion of the covering part 240, there is provided a base 250 coupled to the covering part 240 in such a manner to be opened and closed.

The horizontal transfer means 300 includes a transfer slide 310, a time belt 320, first and second guide rails 331 and 332, a impact-absorbing bar 335, a first motor 340, a location sensing unit 350, a drop prevention part 360, a torsion spring 363. The transfer slide 310 horizontally transfers the 'C1' or the 'C2' and the time belt 320 horizontally moves the transfer slide 310. The first and second guide rails 331 and 332 guide horizontal movement of the transfer slide 310, and the impact-absorbing bar 335 is used to provide a stably horizontal movement of the transfer slide 310. The first motor 340 drives the time belt 320, and the location sensing unit 350 senses where the transfer slide 310 is located. The drop prevention part 360 prevents the 'C2' stored in the first magazine 100-1 from being dropped, and the torsion spring 363 provides outward elastic force to the drop prevention part 360.

The vertical transfer means 400 includes a lower filter holder 410, a push rod 420, a lifting means 430, and a second motor 440. The lower filter holder 410 pushes up the 'C1' transferred from the first magazine 100-1 by the transfer slide 310 in such a manner to be closely contacted with the upper filter holder 230. The push rod 420 pushes up and charges the 'C2' into the second magazine 100-2 when the 'C1' in the upper filter holder 230 is horizontally transferred to the lower portion of the second magazine 100-2. The lifting means 430 lifts both the lower filter holder 410 and the push rod 420, and the second motor 440 drives the lifting means 430. Hereinafter, a detailed description will be given of a construction of an apparatus for sequentially gathering fine particles in accordance with the present invention.

Figure 3A:
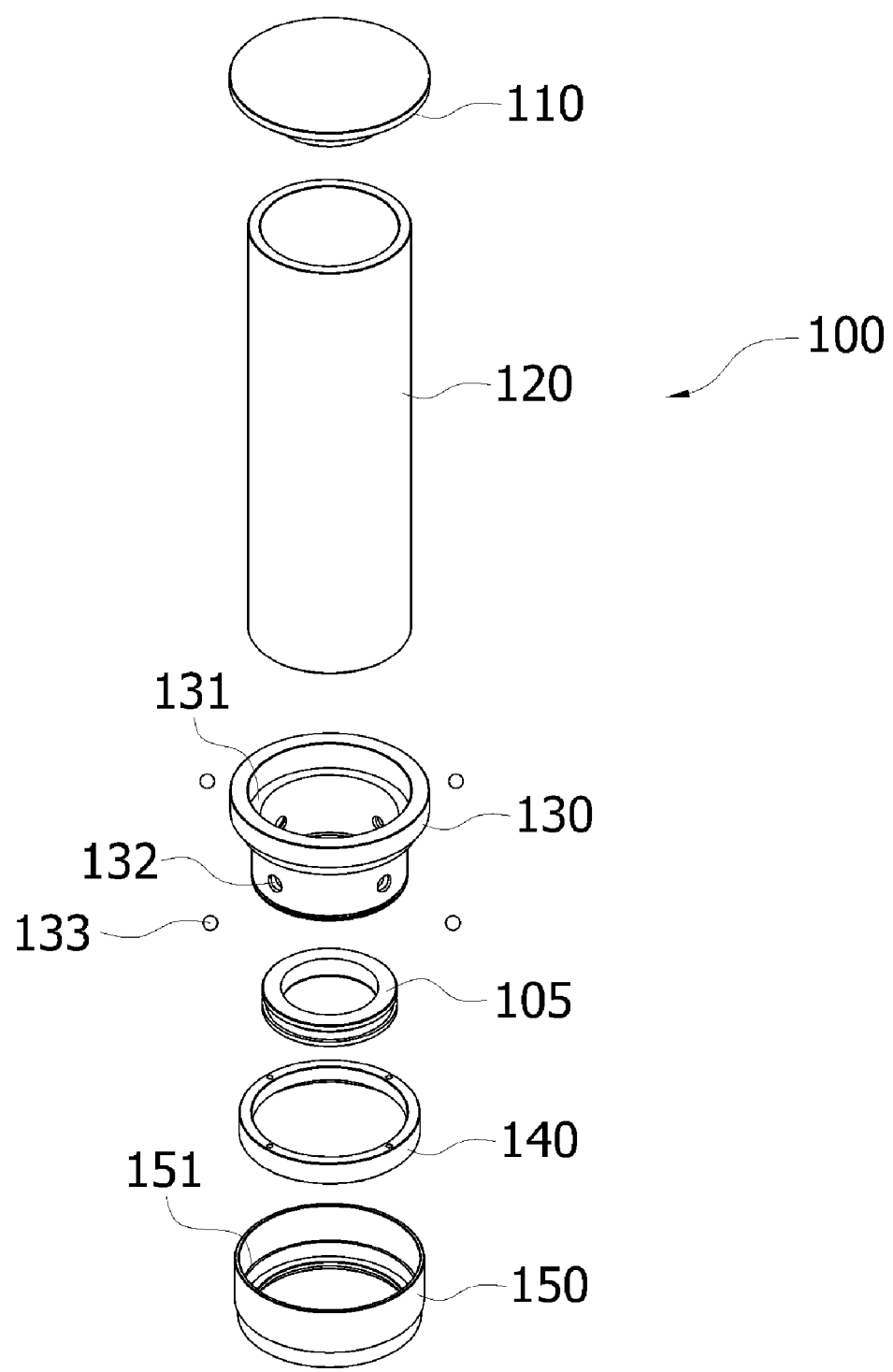
FIG. 3A shows an exploded perspective view of an illustrative embodiment of a magazine for storing a filter cassette.
Figure 3B:
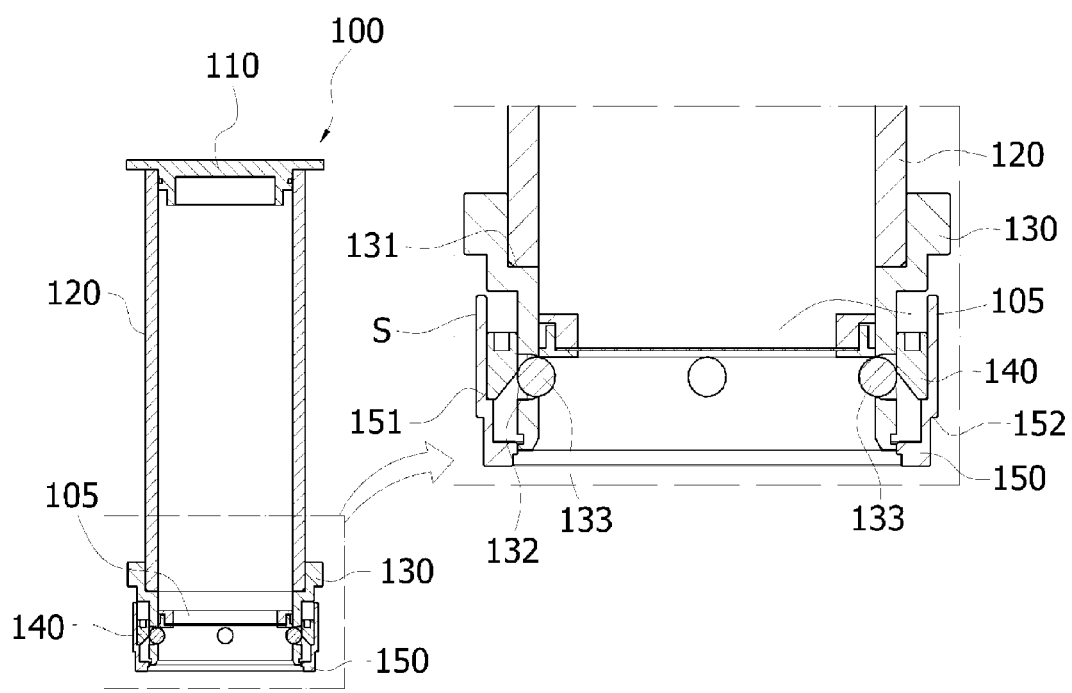
FIG. 3B shows a cross-sectional view of an illustrative embodiment of a magazine for storing a filter cassette.

FIG. 3A shows an exploded perspective view of an illustrative embodiment of a magazine for storing a filter cassette. FIG. 3B shows a cross-sectional view of an illustrative embodiment of a magazine for storing a filter cassette.

Referring to FIGS. 3A and 3B, a magazine 100 includes a lid 110, a body part 120, a filter cassette holding part 130, a bearing 140, and a mounting part 150. The body part 120 stores the filter cassettes 105, and the filter cassette holding part 130 is coupled to a lower end of the body part 120. The bearing 140 is formed on an outer peripheral surface of the filter cassette holding part 130, and the mounting part 150 is coupled to a lower end of the filter cassette holding part 130 in such a manner to be vertically moved and it allows the magazine 100 to be fixedly mounted on each of the first mounting groove 210 and the second mounting groove 220 of the covering part 240.

Herein, the lower end of the body part 120 is fitted into the filter cassette holding part 130. To this end, the inner peripheral surface of an upper end of the filter cassette holding part 130 is formed with a first stopping projection 131 which allows the lower end of the body part 120 to be seated in the filter cassette holding part 130.

The lower end of the filter cassette holding part 130 has four through holes 132 formed on the outer peripheral surface in a cross direction (e.g. east, west, south, and north). The supporting beads 133 are inserted into the through holes 132, respectively.

The bearing 140 is formed on the outer peripheral surface on which the supporting beads 133 of the filter cassette holding part 130 are positioned, so that the supporting beads 133 fail to be released out of the through holes 132. Also, the lower end of the bearing 140 is formed to be inclined upwardly to the inside thereof.

At this time, the filter cassette 105 is supported by the supporting beads 133 in a cross direction, so that it is possible to stably maintain the portion of the filter cassette 105 without any inclination.

The mounting part 150 is coupled to the lower end of the filter cassette holding part 130 in such a manner to be vertically moved. The inner peripheral surface of the mounting part 150 is formed with a second stopping projection 151 so that the bearing 140 can be seated.

Herein, the bearing 140, which is positioned between the lower end of the filter cassette holding part 130 and the mounting part 150, is vertically moved in a space S formed between the filter cassette holding part 130 and the mounting part 150.

For example, as the mounting part 150 moves upwardly, the bearing 140 is lifted together with the mounting part 150 in the space S.

At this time, when the bearing 140 is moved upward in the space S, the supporting beads 133 is moved to the outside of the through holes 132, and the filter cassette 105 is naturally dropped downward.

Also, at the outer peripheral surface of the lower end of the mounting part 150, there is formed a stopping part 152 due to step. The stopping part 152 allows the magazine 100 to be seated in each of the first mounting groove 210 and the second mounting groove 220.

According to the magazine 100 for storing the filter cassette in accordance with the present invention, it is possible not only to easily transfer a plurality of filter cassettes, but also to keep the filter cassette 105 blocked from the outside, thereby preventing the filter cassette 105 from being contaminated before the filter cassette is used as a sample.

Figure 4:
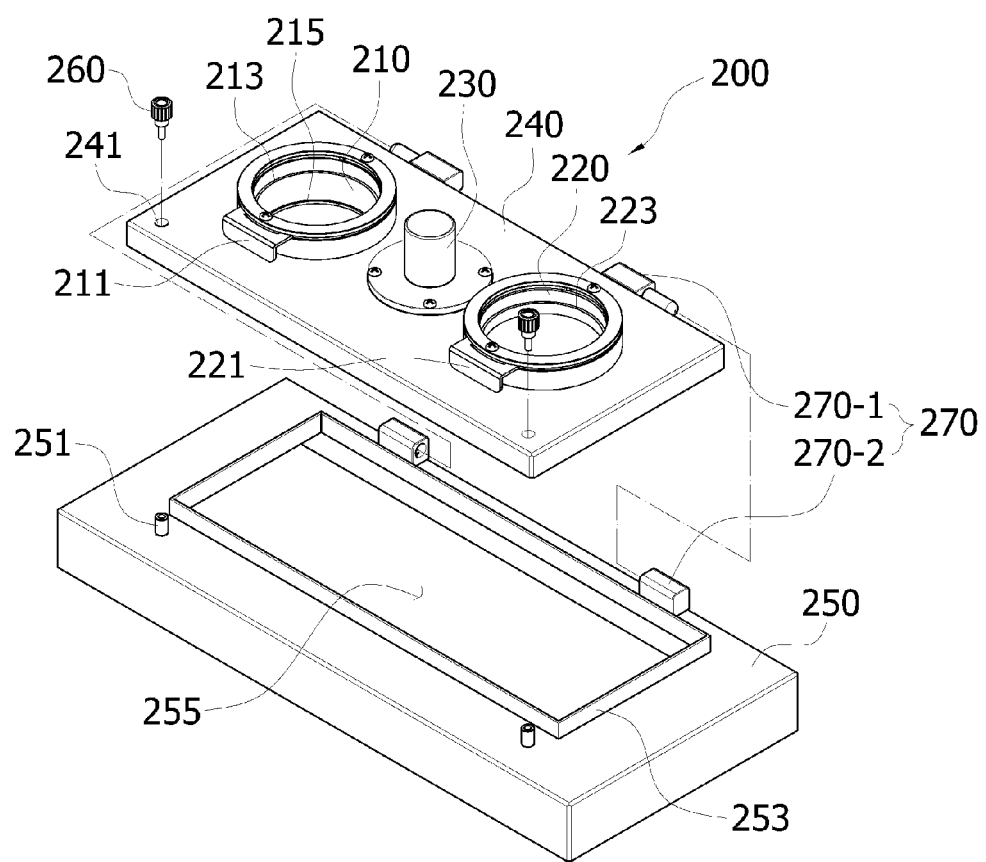
FIG. 4 shows an exploded perspective view of an illustrative embodiment of an upper mounting means.

FIG. 4 shows an exploded perspective view of an illustrative embodiment of an upper mounting means.

Referring to FIG. 4, the upper mounting means 200 includes the covering part 240 formed with the first mounting groove 210, the second mounting groove 220, and the upper filter holder 230, and the base 250 coupled to the lower portion of the covering part 240 so that the covering part 240 can be opened and closed.

On the first mounting groove 210 and the second mounting groove 220, the first magazine 100-1 for storing the 'C1,' and the second magazine 100-2 for storing the 'C2' are mounted respectively.

The first mounting groove 210 and the second mounting groove 220 have a first magazine mounting-releasing button 211 and a second magazine mounting-releasing button 221 formed thereon, respectively.

At this time, when the first magazine mounting-releasing button 211 and the second magazine mounting-releasing button 221 are pushed forward, the first magazine 100-1 and the second magazine 100-2 are mounted or released on/from the first mounting groove 210 and the second mounting groove 220, respectively.

A first-1 mounting stopping projection 213 is formed in the first mounting groove 210 in such a manner that the stopping part 152 of the magazine 100 can be stopped. A first-2 mounting stopping projection 215 is formed on a distal end of the first mounting groove 210 in such a manner to be spaced apart from the first-1 mounting stopping projection 213.

A second mounting stopping projection 223 is formed in the second mounting groove 220 in such a manner that the stopping part 152 of the magazine 100 can be stopped.

Herein, the first mounting groove 210 and the second mounting groove 220 are formed to have a different structure from each other, which is for implementing that the 'C1' is freely dropped in the first magazine 100-1 mounted on the first mounting groove 210, and the 'C2' is pushed up and charged into the second magazine 100-2 mounted on the second mounting groove 220. An explanation thereof will be described in more detail.

The covering part 240 has one side fixedly coupled to the base 250 by means of hinged tightening bolts 260, and the other side fixedly coupled to the base 250 by means of a hinge 270.

To this end, the covering part 240 has engagement holes 241 through which the hinged tightening bolts 260 are inserted so as to be engaged with the bolt engagement part 251 formed on the base 250.

Also, a first hinge 270-1 is formed on the other side of the covering part 240, and a second hinge 270-2 is formed on the base 250. The first hinge 270-1 is fixedly coupled to the second hinge 270-2.

Herein, the covering part 240 can be opened and closed by making the hinged tightening bolts 260 loose. At this time, the other side of the covering part 240 is fixedly coupled to the base 250 through the hinge 270, so the covering part 240 can never be released from the base 250.

At the center of the base 250, there is formed a space part 255 which can be identified when the covering part 240 is opened, and the seating frame 253 is formed along the space part 255 in such a manner that the covering part 240 can be well seated on the base 250.

In the embodiment of the present invention, the covering part 240 is structured to be easily opened and closed, so that it is possible to identify the inside of the horizontal transfer means 300 in spite of individual disassembling of the upper mounting means. Therefore, the present invention has advantages in that it is possible to monitor whether or not the apparatus for sequentially gathering fine particles is well operated, as well as to facilitate management and maintenance of the apparatus when internal repair of the apparatus is required.

That is, in the prior art, maintenance/repair of the apparatus for sequentially gathering fine particles requires the inconvenience caused by detachment of the upper mounting plate through a tool. However, the present invention would simply need to open the covering part 240 by making the hinged tightening bolts 260 loose without having to assemble the upper mounting plate.

Figure 5A:
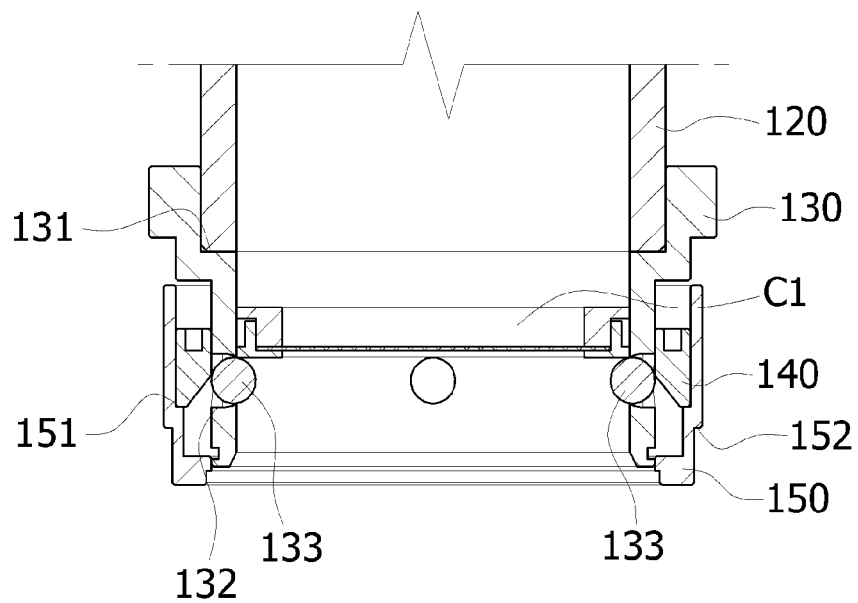
FIGS. 5A and 5B show cross-sectional views of an illustrative embodiment of a state where the filter cassette is dropped after the first magazine is mounted on the first mounting groove, respectively.
Figure 5B:
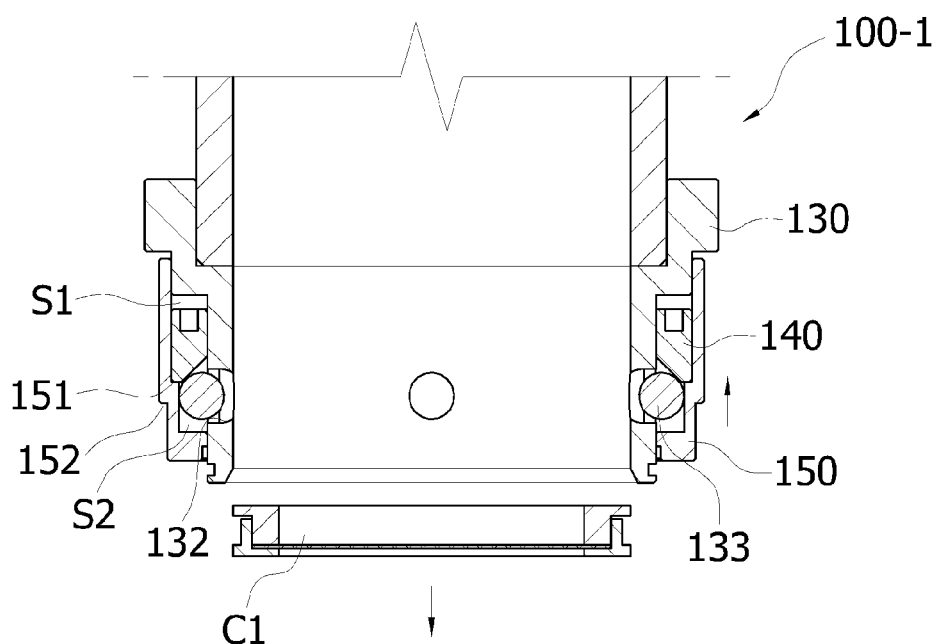

FIGS. 5A and 5B show cross-sectional views of an illustrative embodiment of a state where the filter cassette is dropped after the first magazine is mounted on the first mounting groove, respectively.

Referring to FIG. 5, when the first magazine 100-1 to store the 'C1' is inserted and mounted into the first mounting groove 210 of the covering part 240, the stopping part 152 of the first magazine 100-1 is caught in the first-1 mounting stopping projection 213 within the first mounting groove 210.

At this time, the bearing 140 is positioned on the outer peripheral surface of the through holes 132 of the filter cassette holding part 130, with being seated on the second stopping projection 151 of the mounting part 150.

The supporting beads 133 are positioned in the through holes 132 by the bearing 140, so the 'C1' can be stably supported in the first magazine 100-1 by the supporting beads 133 (see FIG. 5A).

Thereafter, when force is applied to the first magazine 100-1 so that the lower end of the first magazine 100-1 is pushed toward the inside of the first mounting groove 210 until it is caught in the first-2 mounting stopping projection 215, the mounting part 150 of the first magazine 100-1 is vertically lifted by the first-1 mounting stopping projection 213. At this time, the bearing 140 seated in the stopping part 152 is lifted together with the mounting part 150 (see FIG. 5B).

That is, as the mounting part 150 is lifted, the bearing 140 is moved upward together with the mounting part 150 in the space S1 formed between the filter cassette holding part 130 and the mounting part 150.

Then, there is generated a space S2 between the mounting part 150 and the through holes 132. The supporting beads 133 are moved into the space S2 between the mounting part 150 and the through holes 132, and thus the 'C1' is naturally dropped downward.

In this case, the supporting beads 133 are smoothly moved to the space S2 between the mounting part 150 and the through holes 132, so that it is possible to drop the 'C1' without any inclination. Therefore, it is possible to prevent damage caused by the drop of the 'C1'.

That is, in the prior art, a part for supporting a filter cassette within a magazine is shaped like a rake. In this case, rakes installed in a cross direction fail to be smoothly operated, so there occur some difficulties where the filter cassette is dropped while being inclined. However, the present invention provides prevention of this damage caused by drop of the filter cassette.

As such, the first mounting groove 210 has the first-1 mounting stopping projection 213 formed therein to catch the stopping part 152 of the magazine, in addition to the first-2 mounting stopping projection 215 formed on the distal end thereof in such a manner to be spaced apart from the first-1 mounting stopping projection 213. This reason is for implementing that the 'C1' is freely dropped in the first magazine 100-1 mounted on the first mounting groove 210.

Figure 6A:
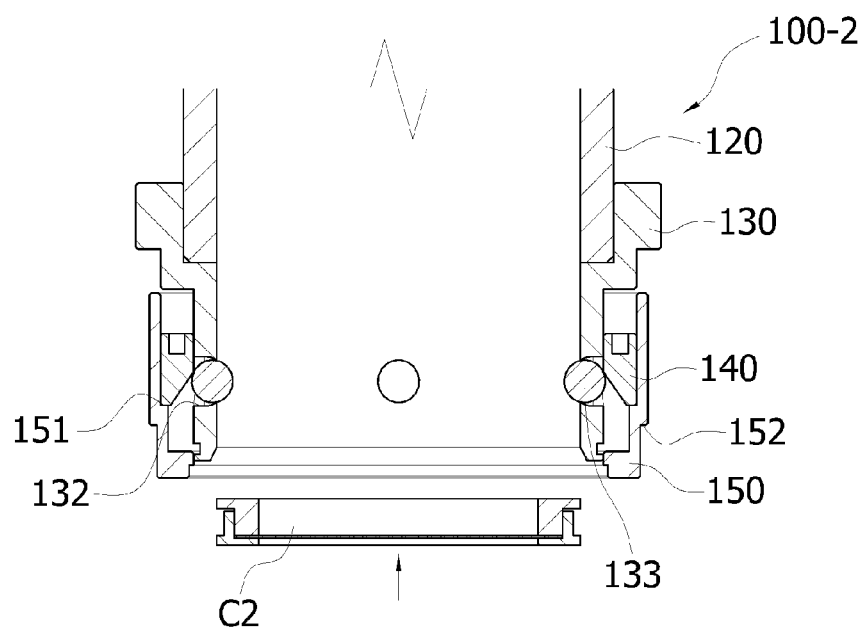
FIGS. 6A to 6C show cross-sectional views of an illustrative embodiment of a state where the filter cassette is charged into the second magazine by being pushed up when the second magazine is mounted on the second mounting groove.
Figure 6B:
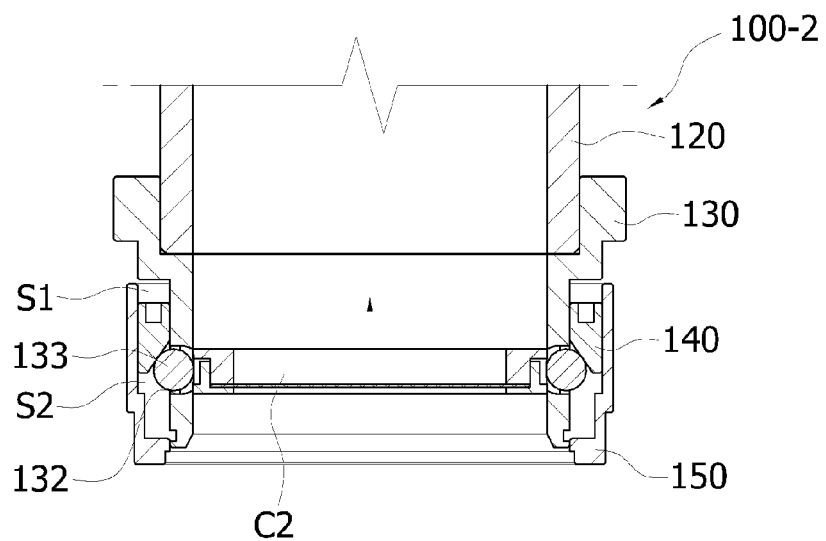
Figure 6C:
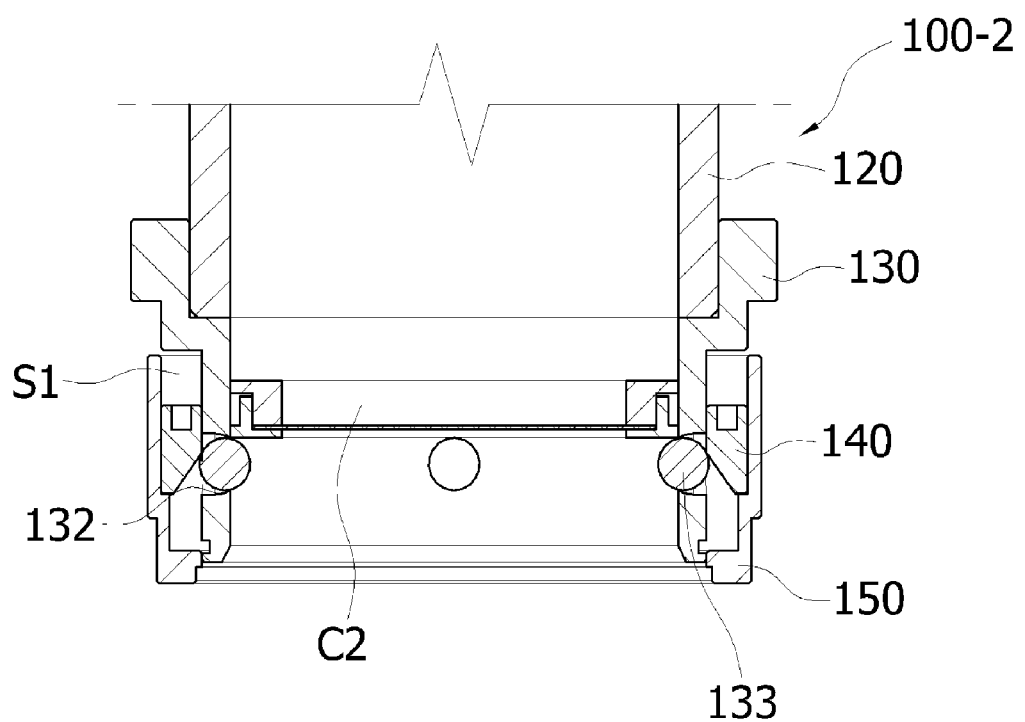

FIGS. 6A to 6C show cross-sectional views of an illustrative embodiment of a state where the filter cassette is charged into the second magazine by being pushed up when the second magazine is mounted on the second mounting groove.

Referring to FIG. 6, when the second magazine 100-2 to store the 'C2' is inserted and mounted on the second mounting groove 220 of the covering part 240, the stopping part 152 of the second magazine 100-2 is caught in the second mounting stopping projection 223 in the second mounting groove 220.

At this time, the bearing 140 having been seated on the second stopping projection 151 of the mounting part 150 is positioned on the outer peripheral surface of the through holes 132 of the filter cassette holding part 130. The supporting beads 133 are positioned in the through holes 132 by the bearing 140 (see FIG. 6A).

Thereafter, when the 'C2' is pushed up toward the inside of the second magazine 100-2 by the push rod 420, the 'C2' extrudes the supporting beads 133 (see FIG. 6B).

At this time, as the supporting beads 133 are extruded to the space S2 formed between the mounting part 150 and the through holes 132, the bearing 140 is pushed upward in the space S1 formed between the filter cassette holding part 130 and the mounting part 150.

That is, the lower end of the bearing 140 is formed to be inclined upward in a direction of the filter cassette holding part 130. For this reason, when the supporting beads 133 are extruded from the through holes 132, the lower end of the bearing 140 is pushed upward in the space S1 formed between the filter cassette holding part 130 and the mounting part 150.

Meanwhile, the supporting beads 133 are not completely extruded to the space S2 between the mounting part 150 and the through holes 132, and the 'C2' is pushed enough to be inserted into the second magazine 100-2.

Next, when the push rod 420 pushes up the 'C2' toward the inside of the second magazine 100-2 by some force, as the bearing 140 having been pushed up in the space S1 between the filter cassette holding part 130 and the mounting part 150 falls again, supporting beads 133 are extruded into the through holes 132 (see FIG. 6C).

Then, the 'C2' having been charged into the second magazine 100-2 is supported by the supporting beads 133 and is stored in the second magazine 100-2.

As such, the inside of the second mounting groove 220 is formed only with the second mounting stopping projection 223 which allows the stopping part 152 of the magazine 100 to be caught. This is for implementing that the 'C2' is charged into the second magazine 100-2 by being pushed up in the second magazine 100-2 mounted on the second mounting groove 220.

Figure 7:
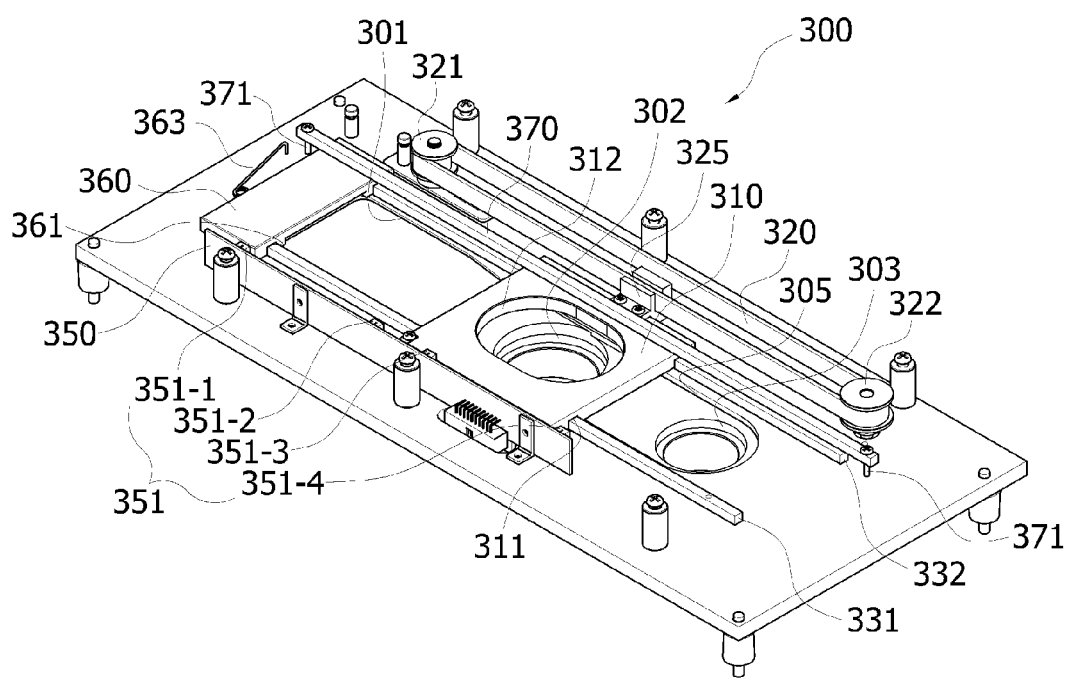
FIG. 7 shows a perspective view of an illustrative embodiment of a horizontal transfer means.

FIG. 7 shows a perspective view of an illustrative embodiment of a horizontal transfer means.

Referring to FIG. 7, the horizontal transfer means 300 is formed with a filter cassette transfer slide 310, a time belt 320, a first guide rail 331 and a second guide rail 332, a first motor 340, and a location sensing unit 350. The filter cassette transfer slide 310 horizontally transfers the 'C1,' or the 'C2,' and the time belt 320 horizontally moves the filter cassette transfer slide 310. The first and second guide rails 331 and 332 guide horizontal movement of the filter cassette transfer slide 310, and the first motor 340 drives the time belt 320. The location sensing unit 350 senses where the filter cassette transfer slide 310 is located.

Also, the drop prevention part 360 is formed on the horizontal transfer means 300 so as to prevent drop of other filter cassettes, which have not gathered fine particles yet, in the first magazine 100-1 when the filter cassette transfer slide 310 of the horizontal transfer means 300 horizontally moves the 'C1' dropped from the first magazine 100-1 in a direction of the upper filter holder 230.

To this end, at a lower portion of the drop prevention part 360, a torsion spring 363 is formed to provide outward elastic force to the location sensing unit 350 when the filter cassette transfer slide 310 is moved in a direction of the upper filter holder 230.

That is, the torsion spring 363 has one end fixedly installed at the horizontal transfer means 300, and the other end fixedly installed at the lower portion of the drop prevention part 360. When the filter cassette transfer slide 310 is moved in a direction of the upper filter holder 230, the drop prevention part 360 provides outward elastic force to the drop prevention part 360 such that it can be moved to the lower portion of the first magazine 100-1.

The filter cassette transfer slide 310 is formed with a pair of guide grooves 311 each of which is coupled to the first guide rail 331 and the second guide rail 332 in such a manner to be horizontally moved along the pair of the guide rails 331 and 332.

The drop prevention part 360 is also formed with a pair of the guide grooves 361 which are coupled to the pair of the guide rails 331 and 332 in such a manner that the filter cassette transfer slide 310 can be horizontally moved along the pair of the guide rails 331 and 332.

The filter cassette transfer slide 310 is moved along the pair of the guide rails 331 and 332 after the filter cassette transfer slide 310 and the drop prevention part 360 are formed with the guide grooves 311 and 361, respectively, thereby reducing friction against the guide rail 330.

A belt connection part 325 is fixedly coupled on one side of the filter cassette transfer slide 310 to be connected to a time belt 320. When the time belt 320 is driven, the filter cassette transfer slide 310 can be horizontally moved along the pair of the guide rails 331 and 332 by a belt connection part 325.

At this time, the time belt 320 is driven, being fixed at each of time belt pulleys 321 and 322.

A filter cassette receiving groove 312 is formed at the center of the filter cassette transfer slide 310 for receiving the filter cassette. The filter cassette receiving groove 312 has an enough space to move filter cassette therein in right and left.

Above the second guide rail 332, an impact-absorbing bar 370 is formed to be parallel to the second guide rail 332 with respect to the filter cassette transfer slide 310 and the drop prevention part 360 interposed therebetween.

The impact-absorbing bar 370 allows the filter cassette transfer slide 310 and the drop prevention part 360 to perform stably horizontal movement.

That is, the impact-absorbing bar 370 is laid above the second guide rail 332 as if it is put on the filter cassette transfer slide 310 and the drop prevention part 360, so that even if there occurs external impact or bounding of a motor, the filter cassette transfer slide 310 and the drop prevention part 360 can be stably moved in a horizontal direction.

A fixing means 371 for fixing the impact-absorbing bar 370 to the horizontal transfer means 300 is formed on both distal ends of the impact-absorbing bar 370. The fixing means 371 is made of a material with elastic force.

Herein, as the fixing means 371 is made of a material with elastic force, even if there exists external impact, it is possible to absorb the external impact instead of transmission of all the external impact to the impact-absorbing bar 370.

The horizontal transfer means 300 has a location sensing unit 350 which is formed to be adjacent to the first guide rail 331.

The location sensing unit 350 is formed of a circuit substrate, and stands on the horizontal transfer means 300 in order to reduce a space occupied by the location sensing unit 350. In this case, it is possible to reduce the size of the horizontal transfer means 300.

At the location sensing unit 350, there are formed location sensors 351 to sense where the filter cassette transfer slide 310 is located.

In the present invention, four location sensors 351 are formed. The location sensors 351 include a location sensor 351-1, location sensors 351-2 and 351-3, a location sensor 351-4, and so on. The location sensor 351-1 senses whether or not the filter cassette transfer slide 310 is positioned below the first magazine 100-1, and the location sensors 351-2 and 351-3 sense whether the filter cassette transfer slide 310 is positioned below the upper filter holder 230. The location sensor 351-4 senses whether the filter cassette transfer slide 310 is positioned below the second magazine 100-2.

According to the present invention, it is possible to automatically perform operation suitable for a corresponding location, by precisely sensing a location of the filter cassette transfer slide 310 through the location sensing unit 350.

Therefore, unlike the prior art, the present invention has advantages in that when there occur any defect and failure of the apparatus for sequentially gathering fine particles, it is unnecessary to individually disassemble parts so as to check the location of the filter cassette transfer slide through internal inspection.

Also, a guide groove 301 for guiding horizontal transfer of the filter cassette is longitudinally formed on the center of the horizontal transfer means 300.

On the lower portion of the upper filter holder 230 of the horizontal transfer means 300, there is formed a lower filter holder lifting hole 302 into which the lower filter holder 410 is inserted so as to be lifted toward the upper filter holder 230 through the horizontal transfer means 300.

On the lower portion of the second magazine 100-2 of the horizontal transfer means 300, there is formed a push rod hole 303 into the push rod 420 is inserted so as to be lifted toward the second magazine 100-2 through the horizontal transfer means 300.

Also, the horizontal transfer means 300 has an indent step groove 305 which is formed on the upper surface thereof by an indentation-step process such that the lower filter holder lifting hole 302 and the push rod lifting hole 303 can be contained. Herein, the indent step groove 305 is formed is formed on an extension of the guide groove 301 and is formed to have a depth lower than that of the guide groove 301.

The 'C1' stored in the filter cassette transfer slide 310 is horizontally transferred within the guide groove 301, and is seated on the indent step groove 305. Then, the 'C1' is allowed to move in right and left so that the 'C1' is accurately positioned on the lower filter holder lifting hole 302. At this time, the 'C1' fails to be reversely moved toward the first magazine 100-1 by the indent step groove 305. A detailed description thereof will be given below.

The 'C2' is horizontally moved to the push rod lifting hole 303 within the indent step groove 305 by the filter cassette transfer slide 310.

Figure 8A:
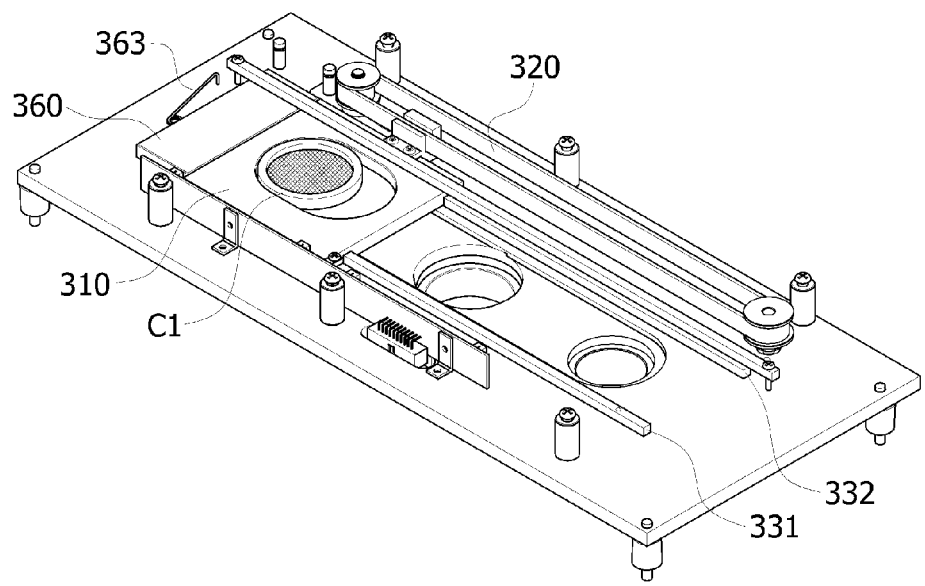
FIGS. 8A and 8B show illustrative embodiments of operations of the drop prevention part, respectively.
Figure 8B:
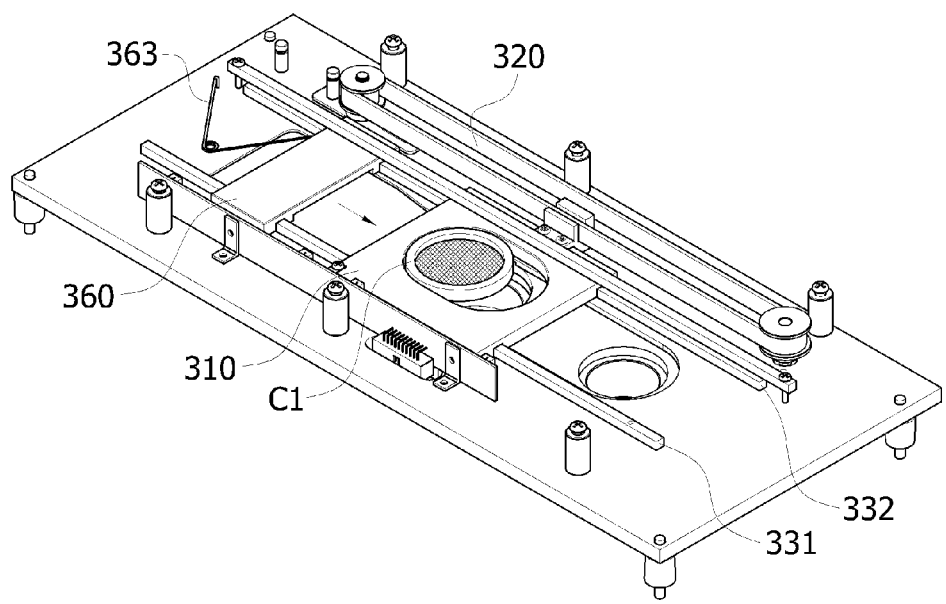

FIGS. 8A and 8B show illustrative embodiments of operations of the drop prevention part, respectively.

Referring to FIG. 8A, the filter cassette transfer slide 310 is positioned below the first magazine 100-1, and stores the 'C1' which falls from the first magazine 100-1.

In this case, the drop prevention part 360 is pushed to one-side distal end of the pair of the guide rails 331 and 332 by the filter cassette transfer slide 310. In this case, the torsion spring 363, which has one end fixedly installed on the horizontal transfer means 300 and the other end fixedly installed on the lower portion of the drop prevention part 360, is contracted keeping elastic force.

Next, referring to FIG. 8B, when the filter cassette transfer slide 310 is horizontally moved toward the upper filter holder 230 by driving of the time belt 320, the elastic force of the torsion spring 363 makes it impossible to drop the 'C1' stored in the first magazine 100-1 any more, as the drop prevention part 360 is horizontally moved along the pair of the guide rails 331 and 332 toward the lower portion of the first magazine 100-1.

FIGS. 9A to 9D show illustrative embodiments of operations for positioning the filter cassette, which has not gathered fine particles yet, on the lower filter holder lifting hole through horizontal movement.

Figure 9A:
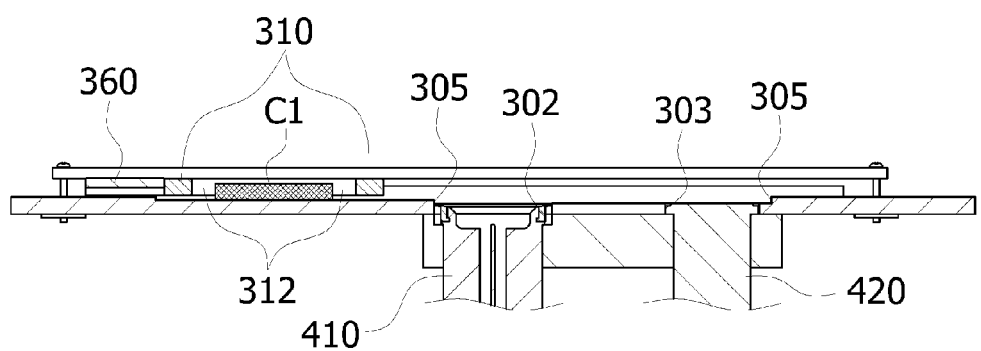
FIGS. 9A to 9D show illustrative embodiments of operations for positioning the filter cassette, which has not gathered fine particles yet, on the lower filter holder lifting hole through horizontal movement.

First, the 'C1' is stored in the filter cassette receiving groove 312 of the filter cassette transfer slide 310 (see FIG. 9A).

Figure 9B:
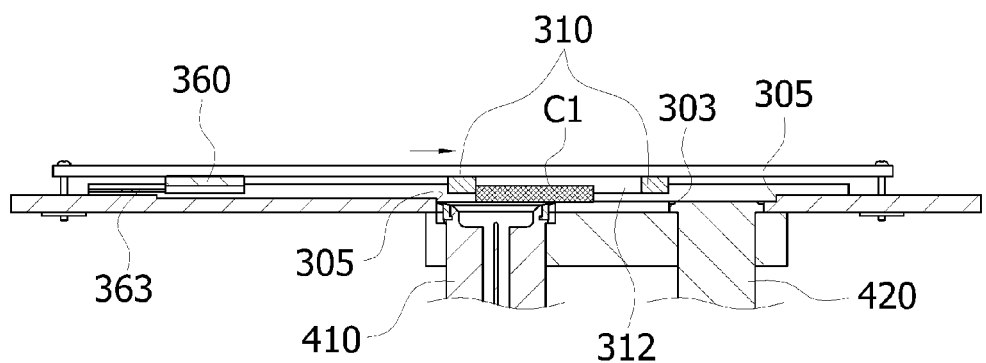

Next, the filter cassette transfer slide 310 is horizontally moved toward the lower filter holder 410 by driving of the time belt 320 (see FIG. 9B).

Then, while being horizontally transferred in the guide groove 301, the 'C1' comes to be seated in the indent step groove 305. At this time, inertia prevents the filter cassette transfer slide 310 from being accurately positioned on the upper portion of the lower filter holder 410, which means that the filter cassette slide 310 passes by lower filter holder 410.

Also, the 'C1' is also positioned after passing by the lower filter holder lifting hole 302. By the inertia, the 'C1' comes into close contact with a left side of the filter cassette receiving groove 312.

Figure 9C:
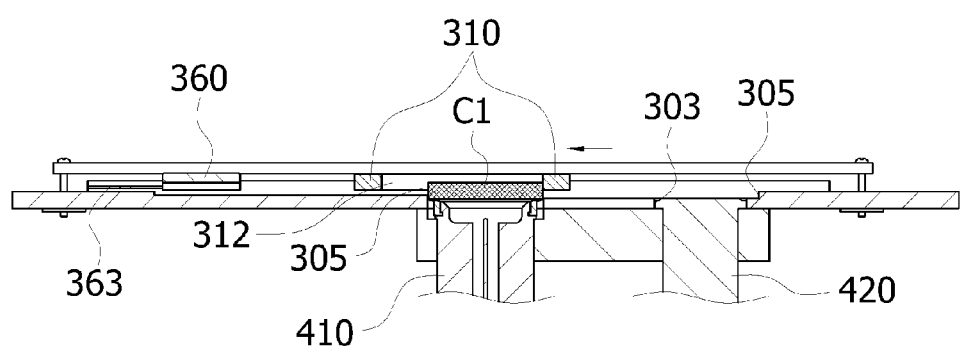

Therefore, the filter cassette transfer slide 310 is horizontally moved again toward the first magazine 100-1 (see FIG. 9C). Then, by the indent step groove 305, the 'C1' is precisely positioned on the lower filter holder lifting hole 302 at the same time when caught in the indent step groove 305.

At this time, the 'C1' comes into close contact with a right side of the filter cassette receiving groove 312. In this case, there occurs some difficulty when the 'C1' is pushed up toward the upper filter holder 230.

Figure 9D:
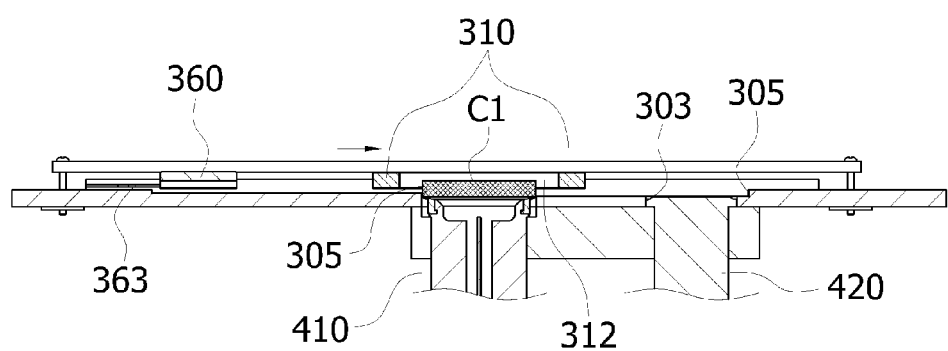

Therefore, the filter cassette transfer slide 310 is slightly moved to a right side so that the 'C1' can be positioned on the center of the filter cassette receiving groove 312 (see FIG. 9D).

Herein, it is possible for four location sensors 351 to precisely sense where the filter cassette transfer slide 310 is located, and thus to precisely control movement of the filter cassette transfer slide 310.

As such, in the present invention, it is possible to sense where the filter cassette transfer slide 310 is located through the location sensors 351, and thus to precisely control movement of the filter cassette transfer slide 310. Therefore, the 'C1' can be accurately positioned on the lower filter holder lifting hole 302.

In the prior art, it is impossible to identify where or not the 'C1' is accurately located on the lower portion of the upper filter holder (or upper portion of the lower filter holder).

Therefore, in the case where the 'C1' is not accurately positioned at a corresponding location, when the lower filter holder pushes up the 'C1' toward the upper filter holder, the 'C1' is dropped due to shaking, or fails to come into close contact with the lower portion of the upper filter holder. This means that the inaccurate location of the 'C' sometimes causes malfunction.

Figure 10A:
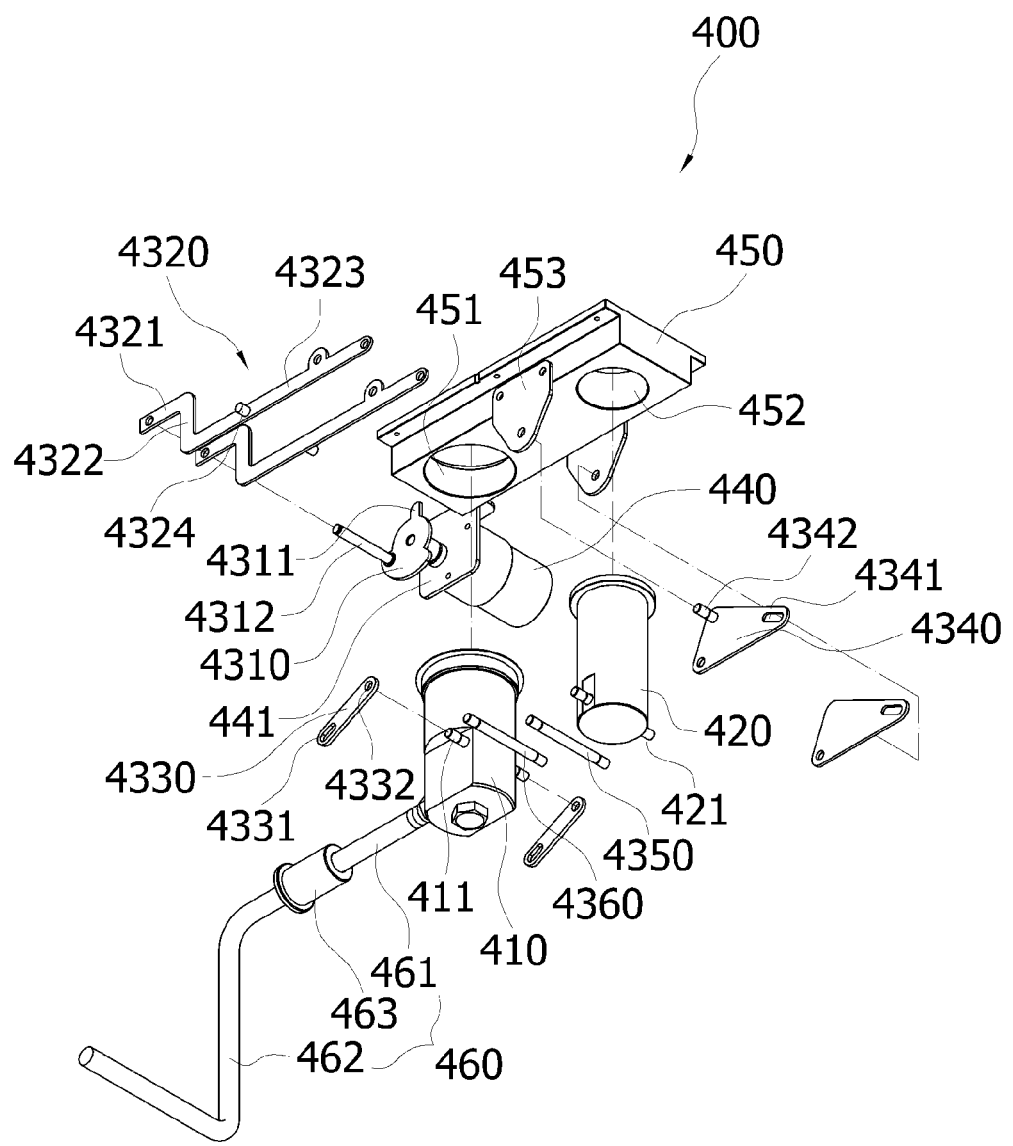
FIGS. 10A and 10B show exploded perspective views of an illustrative embodiment of a vertical transfer means, respectively.
Figure 10B:
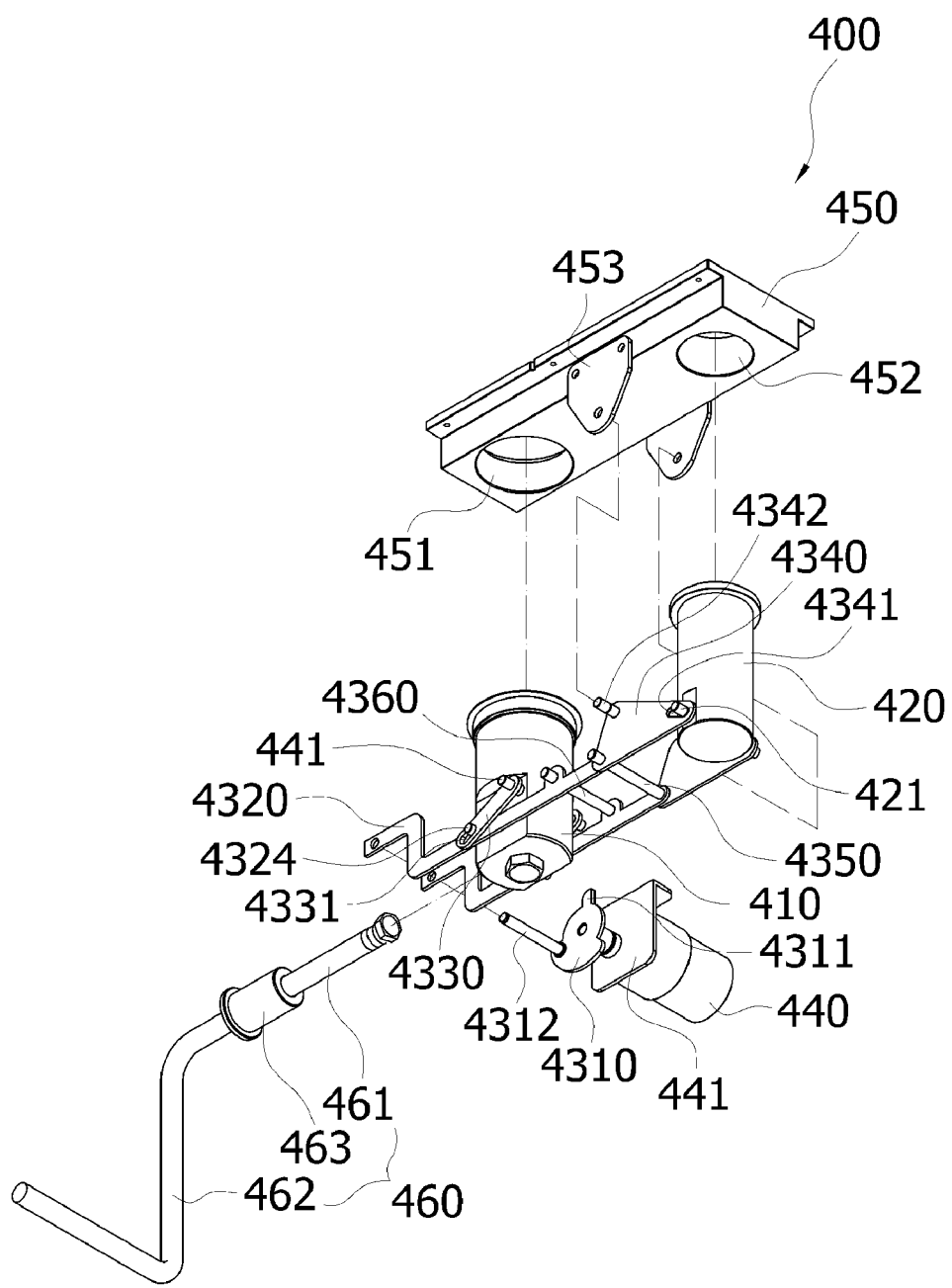

FIGS. 10A and 10B show exploded perspective views of an illustrative embodiment of a vertical transfer means, respectively.

Referring to FIGS. 10A and 10B, the vertical transfer means 400 includes a lower filter holder 410, a push rod 420, a lifting means 430, and a second motor 440. The lower filter holder 410 pushes up the 'C1' horizontally transferred from the first magazine 100-1 by the filter cassette transfer slide 310 to be close to the upper filter holder 230. When the 'C2' gathered in the upper filter holder 230 is horizontally moved to the lower portion of the second magazine 100-2, the push rod 420 pushes up and charges the 'C2' into the second magazine 100-2. The lifting means 430 lifts the lower filter holder 410 and the push rod 420, and the second motor 440 drives the lifting means 430. Herein, the second motor 440 is mounted on one surface of the motor mounting part 441 formed on the lower surface of the horizontal transfer means 300.

The vertical transfer means 400 further includes a bracket 450 which is to be mounted on the lower surface of the horizontal transfer means 300. In particular, the bracket 450 is formed on the lower portion of the indent step groove 305.

The bracket 450 is provided with a first insertion hole 451 and a second insertion hole 452 through which the lower filter holder 410 and the push rod 420 are inserted so as to be seated on the lower filter holder lifting hole 302 and push rod lifting hole 303 of the horizontal transfer means 300.

Also, the vertical transfer means 400 further includes a pumping connection means 460 for connecting a pumping means (not shown) to the lower filter holder 410.

That is, in the present invention, the vertical transfer means 400 further includes a pumping means (not sown) for sucking external air so as to gather fine particles from the outside in a state where the 'C1' comes into close contact with the lower portion of the upper filter holder 230.

At this time, the pumping connection means 460 is required that connects the pumping means (not shown) to the lower filter holder 410 so as to suck air from the outside.

The pumping connection means 460 includes a connection hose 461, a pumping tube 462, and a connection tube 463. The connection tube 463, which is positioned between the connection hose 461 and the pumping tube 462, has one end connected to the connection hose 461 and the other end connected to the pumping tube 462. The other end of the connection hose 461 is connected to the lower filter holder 410, and the other end of the pumping tube 462 is connected to the pumping means (not shown).

Herein, the connection hose 461 is made of a material with flexibility since it can move together with the lower filter holder 410 when the lower filter holder 410 is lifted.

Meanwhile, the lifting means 430 is connected to the second motor 440 on the other surface of the motor mounting part 441. The lifting means 430 includes a rotary member 4310, a pair of translation members 4320, a pair of first lifting members 4330, and a pair of second lifting members 4340. The rotary member 4310 is connected to the second motor 440 on the other surface of the motor mounting part 441, and rotates while being driven by the second motor 440. The translation members 4320 are connected to the rotary member 4310 in such a manner to change the rotation movement of the rotary member 4310 into the translation movement, and are formed to be parallel to each other with respect to the lower filter holder 410 interposed therebetween. Each of the first lifting members 4330 has one end connected to each of the translation members 4320, and the other end connected to the lower filter holder 410, and lifts the lower filter holder 410 according to the translation movement of the translation members 4320. Each of the second lifting members 4340 has one side connected to each of the translation members 4320, and another side connected to the bracket 450, and the other side connected to the push rod 420, and lifts the push rod 420 according to the translation movement of the translation members 4320.

The rotary member 4310 rotates in a clockwise direction or in a counterclockwise direction according to driving of the second motor 440. For example, when the lower filter holder 410 and the push rod 420 are lifted, the rotary member 4310 rotates in a counterclockwise direction. When the lower filter holder 410 and the push rod 420 are lowered, the rotary member 4310 rotates in a clockwise direction.

The rotary member 4310 has a hitting protrusion 4311 which hits one of first and second switches 471 and 472 as the rotary member 4310 rotates, and the rotary member 4310 is provided with connection part 4312 formed on its side surface so as to connect the pair of the translation members 4320.

The first and second switches 471 and 472 generate a predetermined signal by hitting of the hitting protrusion 4311, thereby identifying where the lower filter holder 410 and the push rod 420 are located.

That is, if the hitting protrusion 4311 presses the first switch 471, it is possible to identify that the lower filter holder 410 and the push rod 420 are in a lowered state. If the hitting protrusion 4311 presses the second switch 472, it is possible to identify that the lower filter holder 410 and the push rod 420 are in a lifted state.

The pair of the translation members 4320 are connected to the rotary member 4310 through the connection part 4312. The translation members 4320 include a first horizontal part 4321, a vertical part 4322, and a second horizontal part 4323. The first horizontal part 4321 extends in a longitudinal direction of the horizontal transfer means 300, and the vertical part 4322 extends in a vertical direction of the first horizontal part 4321. The second horizontal part 4323 extends to be parallel to the first horizontal part 4321 from the vertical part 4322.

The pair of the translation members 4320 are formed to be parallel to the lower filter holder 410 with respect to the lower filter holder 410 interposed therebetween, and a side surface of the second horizontal part 4323 is provided with a first connection protrusion 4324 outwardly protruded for connection of the first lifting member 4330.

The distal end of the second horizontal part 4323 is connected to the second lifting member 4340 through the first connection rod 4350. Also, the pair of the second horizontal part 4323 are coupled to each other through a second connection rod 4360 in such a manner to be arranged at a predetermined interval.

On one end of the first lifting member 4330, there is formed a first moving hole 4331 which is engaged with the first connection protrusion 4324 so as to be movable in right and left, and on the other end of the first lifting member 4330, there is formed a connection hole 4332 which is connected to the lower filter holder 410.

To this end, at both sides of the lower filter holder 410, there is formed a second connection protrusion 411 inserted into the connection hole 4332 of the first lifting member 4330 for connection them.

The first lifting member 4330 comes into contact with both sides of the lower filter holder 410. At this time, both sides of the lower filter holder 410 being in contact with the first lifting member 4330 are formed to be parallel to each other.

Also, the first lifting member 4330 is formed to be inclined upwardly between the translation members 4320 and the lower filter holder 410.

Therefore, according to the translation movement of the translation members 4320, the pair of the first lifting members 4330 lift the lower filter holder 410 as the first connection protrusion 4324 is moved along the first moving hole 4331 in right and left.

The translation members 4320 are shaped like a triangle which has one-side apex connected to the pair of the translation members 4320 through the first connection rod 4350, the other-side apex connected to the push rod 420 through the third connection protrusion 421 formed on both sides of the push rod 420, and a central apex connected to a connection piece 453 formed at both sides of the bracket 450.

At the other-side apex of the second lifting member 4340, there is formed the second moving hole 4341 through the third connection protrusion 421 is inserted so as to be movable in right and left. At this time, the second moving hole 4341 longitudinally extends along sides of the second lifting member 4340 with the triangle shape.

At the central apex of the second lifting member 4340, there is formed a fourth connection protrusion 4342 outwardly protruded so as to be connected to the connection piece 453.

As the pair of the translation members 4320 rotate, the pair of the second lifting members 4340 lift the push rod 4240 while rotating about the position connected to the bracket 450.

According to the present invention, the apparatus for gathering fine parcels is formed to have a simple structure where it is possible to lift the lower filter holder 410 and the push rod 420, so that it is possible to reduce manufacturing cost and parts, and to prevent frequent malfunction.

FIGS. 11A to 11H show illustrative embodiments of all operations of the apparatus for sequentially gathering fine particles, respectively.

Figure 11A:
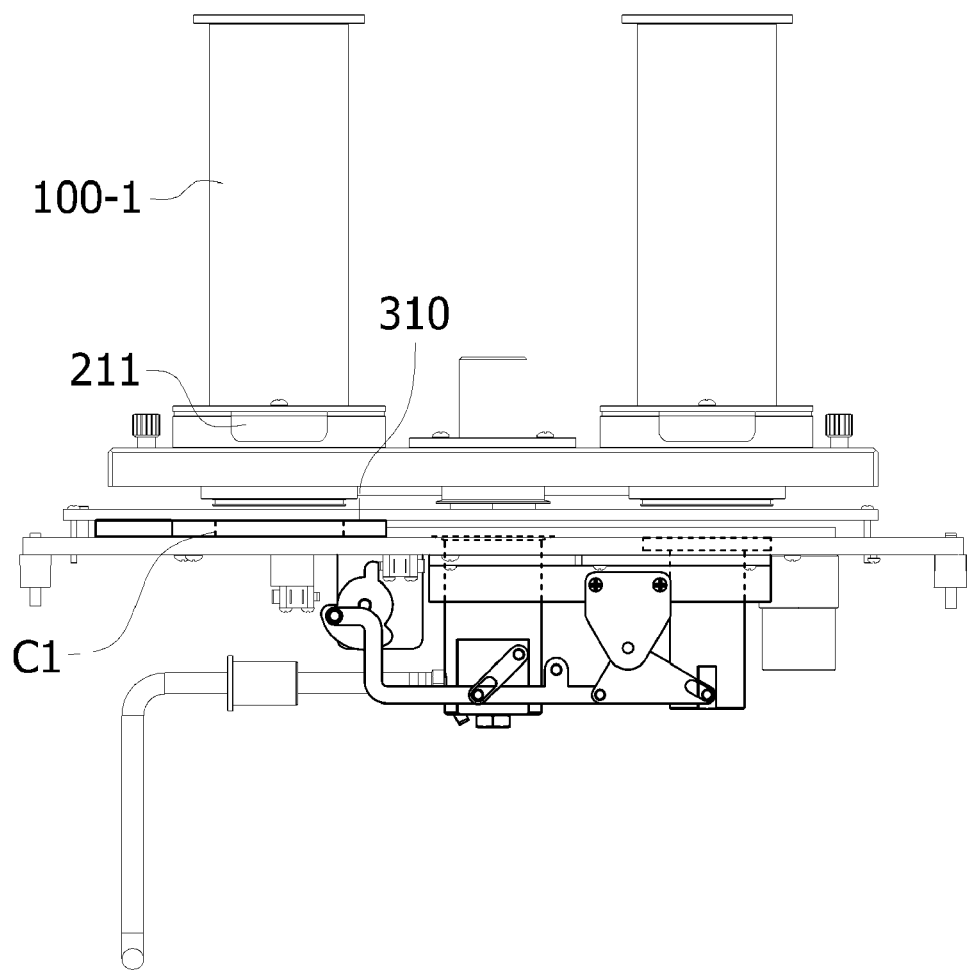
FIGS. 11A to 11H show illustrative embodiments of all operations of the apparatus for sequentially gathering fine particles, respectively.

First, the filter cassette transfer slide 310 is positioned below the first magazine 100-1, and receives the 'C1' dropped from the first magazine 100-1 (see FIG. 11A).

That is, in a state where a first magazine mounting-releasing button 211 is pressed, when the first magazine 100-1 is mounted into the first mounting groove 210, the 'C1' stored in the first magazine 100-1 is dropped and received in the filter cassette receiving groove 312 of the filter cassette transfer slide 310.

Figure 11B:
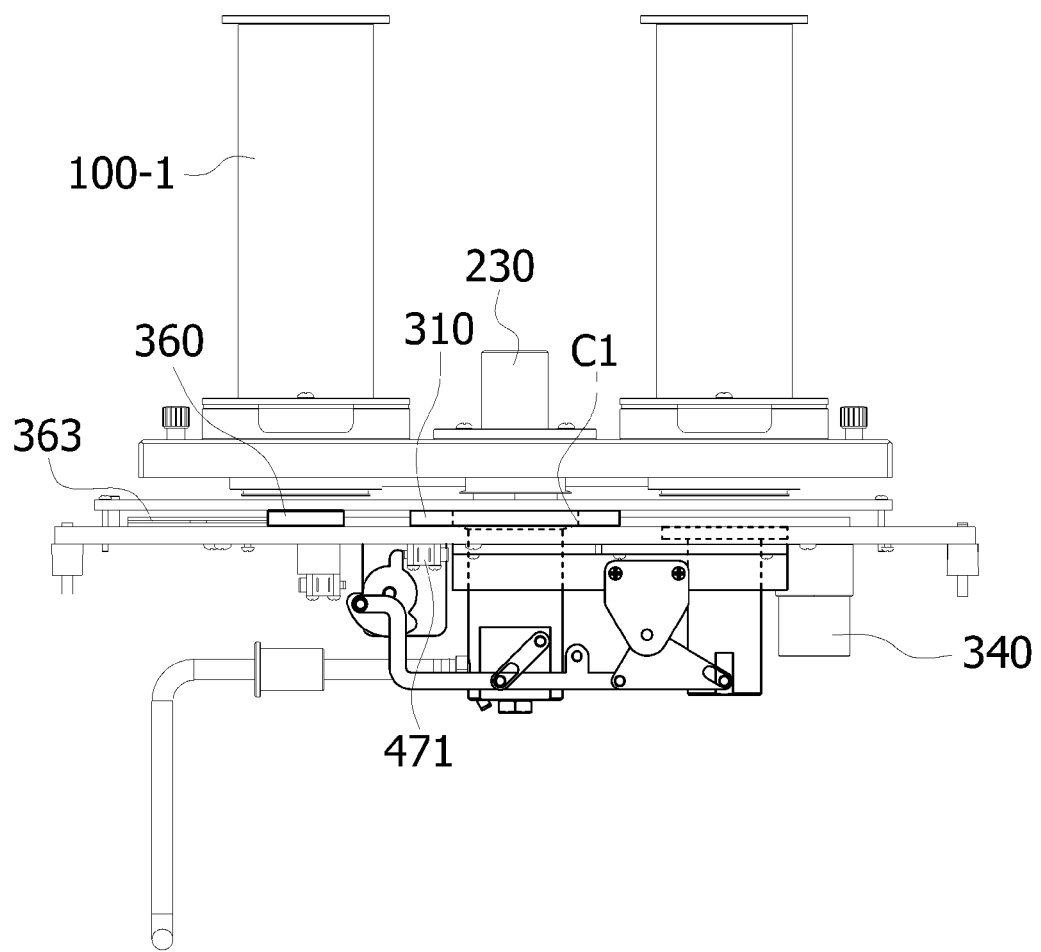

Next, the first motor 340 drives the time belt 320, thereby horizontally moving the filter cassette transfer slide 310 up to the location of the lower filter holder lifting hole 302 (see FIG. 11B). That is, the 'C1' received in the filter cassette receiving groove 312 is accurately positioned below he upper filter holder 230.

In the present invention, it is possible to accurately sense the location of the filter cassette transfer slide 310 through the location sensors 351 to thereby control precisely movement of the filter cassette transfer slide 310. Therefore, it is possible to accurately the filter cassette, which has not gathered fine particles yet (C1), at the lower portion of the upper filter holder 230.

At this time, elastic force of the torsion spring 363 having been contracted by the filter cassette transfer slide 310 prevents the 'C1' stored in the first magazine 100-1 from being dropped any more, as the drop prevention part 360 is moved toward the lower portion of the first magazine 100-1.

The hitting protrusion 4311 of the rotary member 4310 is in a state where it presses the first switch 471.

Figure 11C:
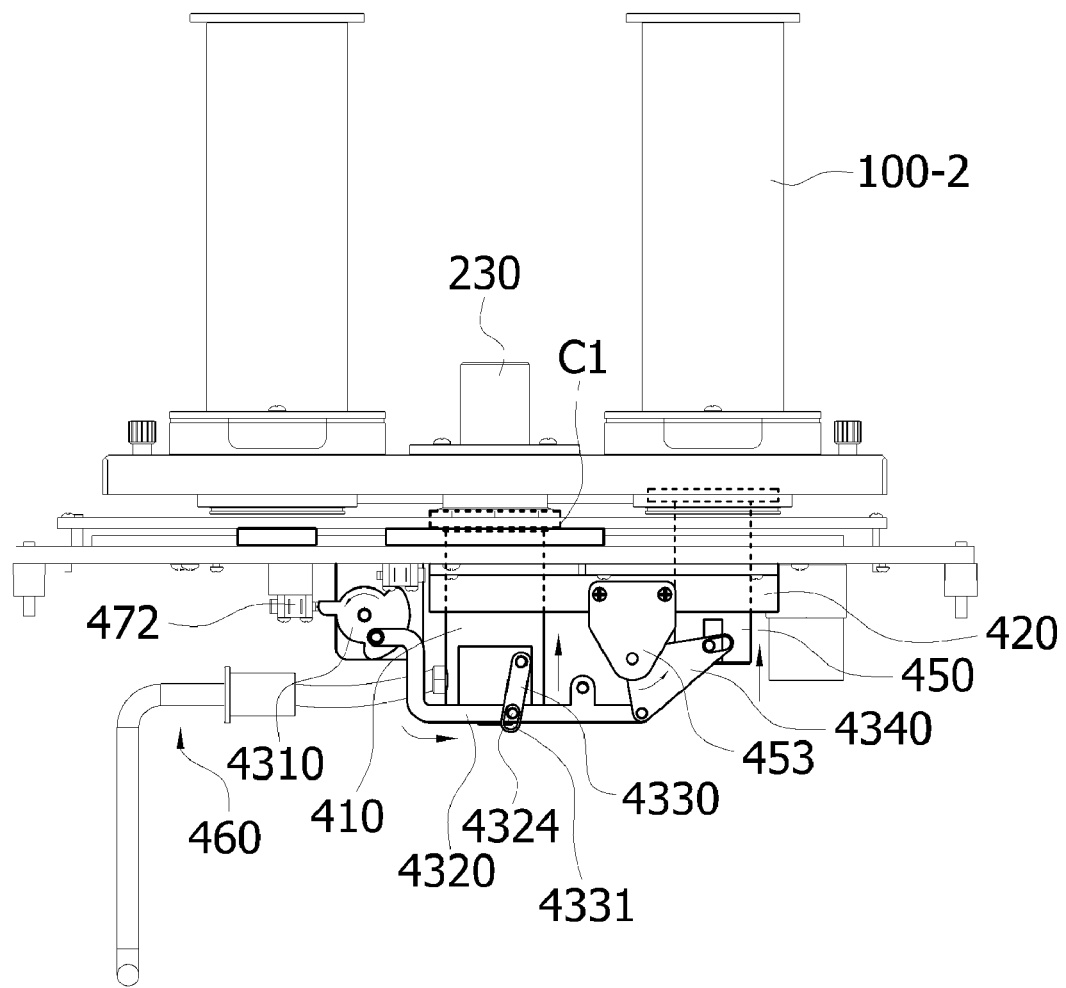

Thereafter, the second motor 440 rotates the rotary member 4310 in a counterclockwise direction (see FIG. 11C).

Then, as the pair of the translation members 4320 connected to the rotary member 4310 are translation-moved toward the second magazine 100-2, the first lifting member 4330 connected to the translation members 4320 lifts the lower filter holder 410 toward the upper filter holder 230.

At this time, the first connection protrusion 4324 of the translation members 4320 is moved to a right side from a left side of the first moving hole 4331 of the first lifting member 4330.

When the lower filter holder 410 is lifted toward the upper filter holder 230, the 'C1' positioned at the lower filter holder lifting hole 302 is pushed up to thereby come into close contact with the lower portion of the upper filter holder 230.

Herein, the 'C1' can gather fine particles from the outside in a state where it comes into close contact with the lower portion of the upper filter holder 230. At this time, the pumping means (not shown) and the pumping connection means 460 connected to the lower filter holder 410 are used so as to suck air from the outside.

Also, as the pair of the translation members 4320 connected to the rotary member 4310 are translation-moved toward the second magazine 100-2, the translation members 4320 connected to the translation members 4320 lift the push rod 420 while being rotated about the position where the connection piece 453 of the bracket 450 is connected.

At this time, the third connection protrusion 421 of the push rod 420 is moved to a left side from the a right side of the second moving hole 4341 of the second lifting member 4340.

Meanwhile, at the moment when the rotary member 4310 has been completely rotated in a counterclockwise direction, the hitting protrusion 4311 presses the second switch 472. At this time, the second switch 472 generates a predetermined signal, thereby identifying that the lower filter holder 410 and the push rod 420 have completely performed lifting operation.

Figure 11D:
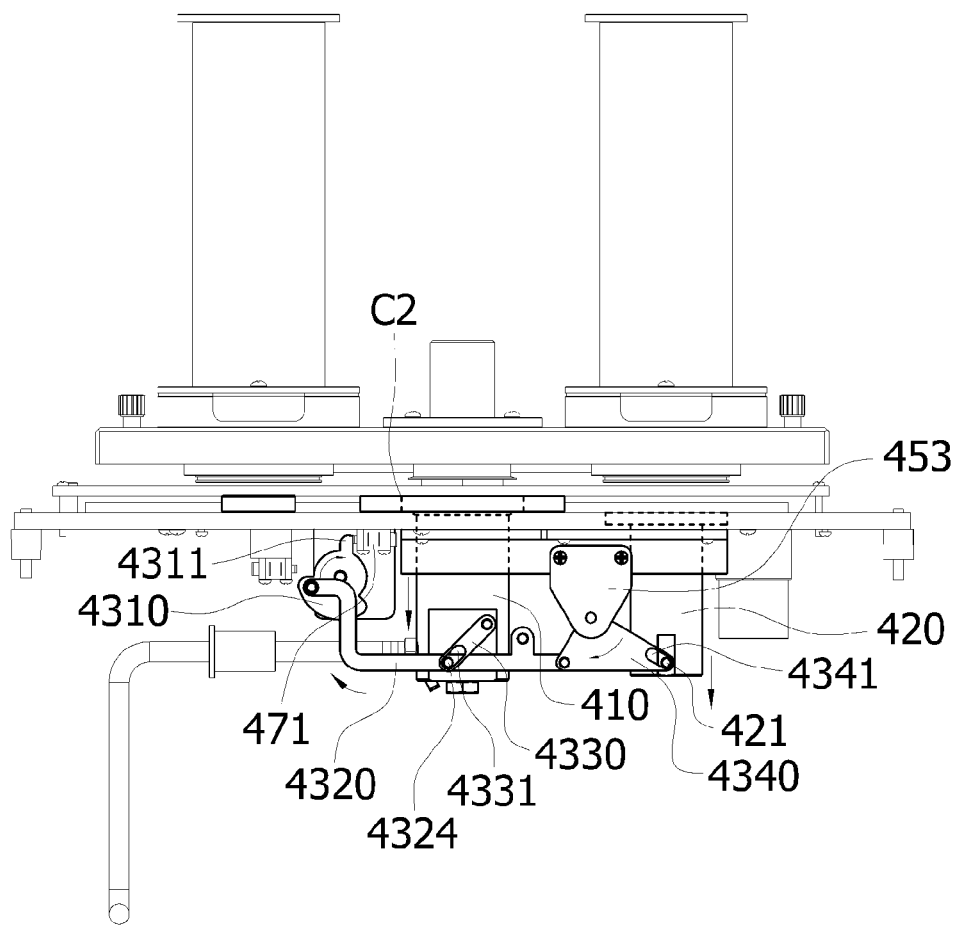

Subsequently, after fine particles are gathered through the upper filter holder 230, the second motor 440 rotates the rotary member 4310 in a clockwise direction (see FIG. 11D).

Then, while the pair of the translation members 4320 connected to the rotary member 4310 are translation-moved toward the first magazine 100-1, the first lifting member 4330 connected to the translation members 4320 lowers the lower filter holder 410. At this time, the first connection protrusion 4324 is moved again to a left side from a right side of the first moving hole 4331. The 'C2' is placed at the lower filter holder lifting hole 302.

Also, while the pair of the translation members 4320 connected to the rotary member 4310 are translation-moved toward the first magazine 100-1, the second lifting member 4340 connected to the translation members 4320 lowers the push rod 420 while being rotated about the position where it is connected to the connection piece 453. At this time, the third connection protrusion 421 is moved again to a right side from a left side of the first horizontal part 4321.

Meanwhile, at the moment when the rotary member 4310 has been completely rotated in a clockwise direction, the hitting protrusion 4311 presses the first switch 471. At this time, the first switch 471 generates a predetermined signal, thereby identifying that the lower filter holder 410 and the push rod 420 have been completely lowered.

Figure 11E:
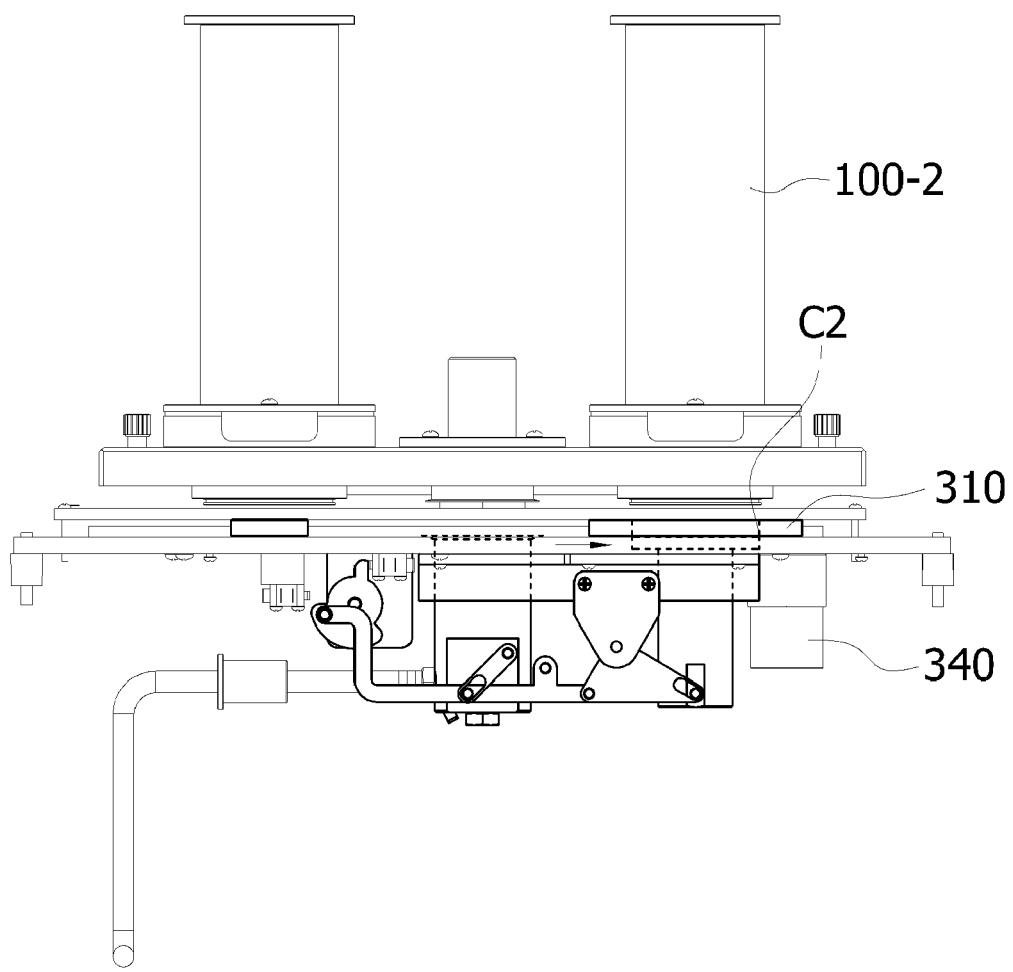

Next, the first motor 340 drives the time belt 320 to thereby horizontally move the filter cassette transfer slide 310 toward the lower portion of the second magazine 100-2 (see FIG. 11E). At this time, the 'C2' received in the filter cassette receiving groove 312 is positioned at the push rod lifting hole 303 of the lower portion of the second magazine 100-2.

Figure 11F:
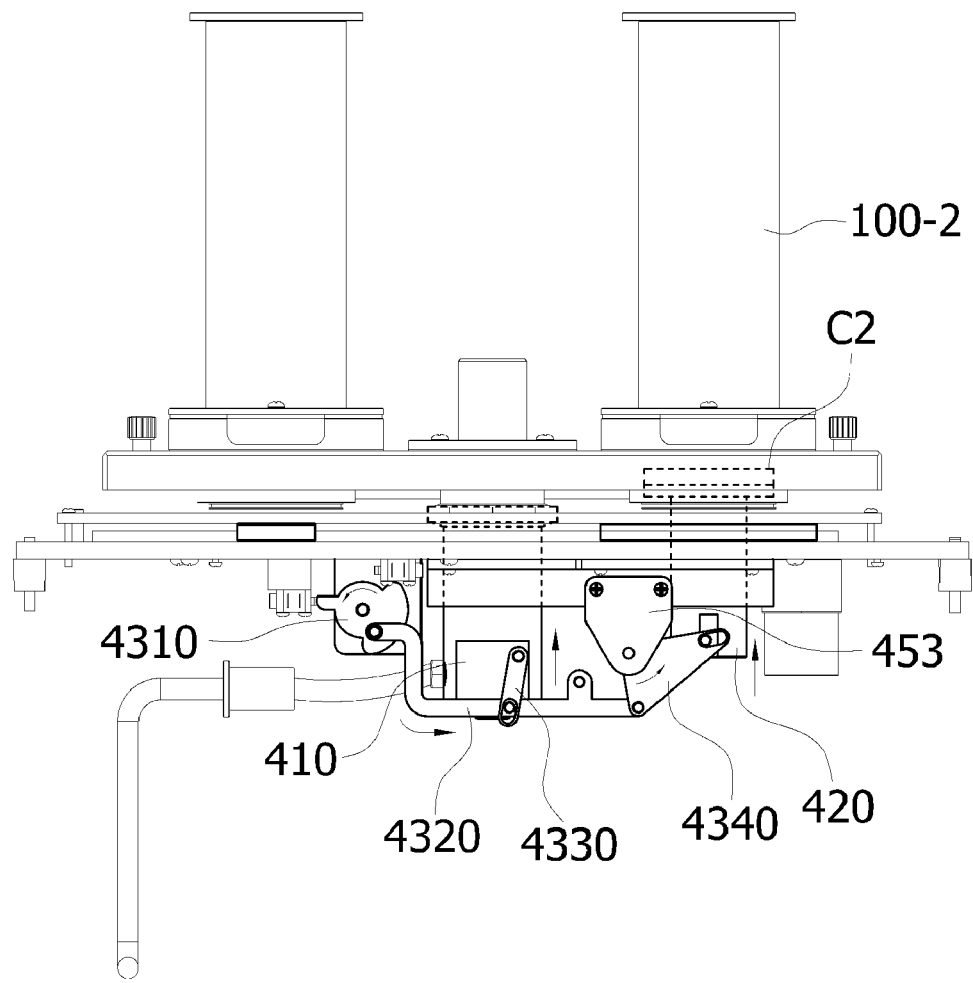

Subsequently, the second motor 440 drives the rotary member 4310 in a counterclockwise direction (see FIG. 11F).

Then, while the pair of the translation members 4320 connected to the rotary member 4310 are translation-moved toward the second magazine 100-2, the first lifting member 4330 connected to the translation members 4320 lifts the lower filter holder 410 toward the upper filter holder 230.

Also, while the second lifting member 4340 connected to the translation members 4320 lifts the push rod 420 while being rotated about the portion connected to the connection piece 453 in a counterclockwise direction.

At this time, the 'C2' positioned at the push rod lifting hole 303 is lifted, and then is pushed up toward the inside of the second magazine 100-2 to thereby be inserted into the second magazine 100-2.

Figure 11G:
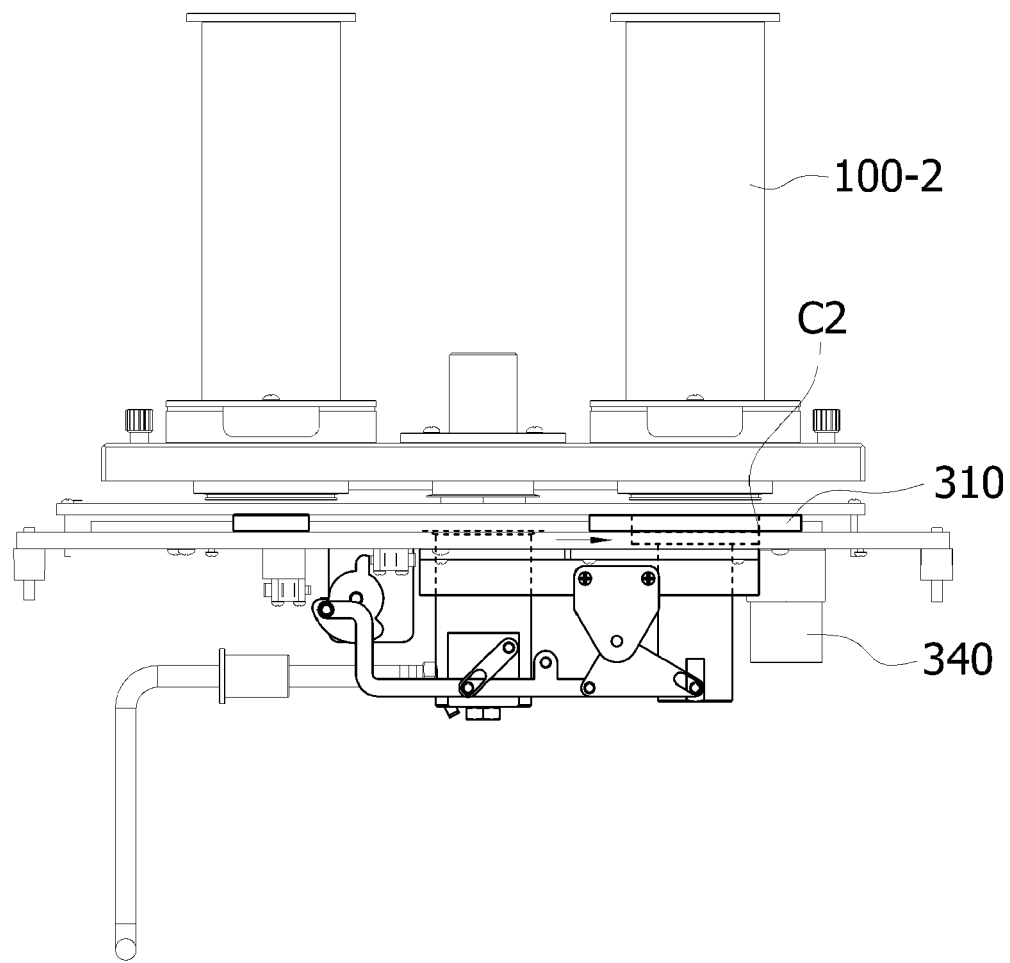

Subsequently, the second motor 440 rotates the 4310 in a clockwise direction (see FIG. 11G).

Then, while the pair of the translation members 4320 connected to the rotary member 4310 are translation-moved toward the first magazine 100-1, the first lifting member 4330 connected to the translation members 4320 lowers the lower filter holder 410.

Also, the second lifting member 4340 connected to the translation members 4320 lowers the push rod 420 while being rotated about the position connected to the connection piece 453.

Figure 11H:
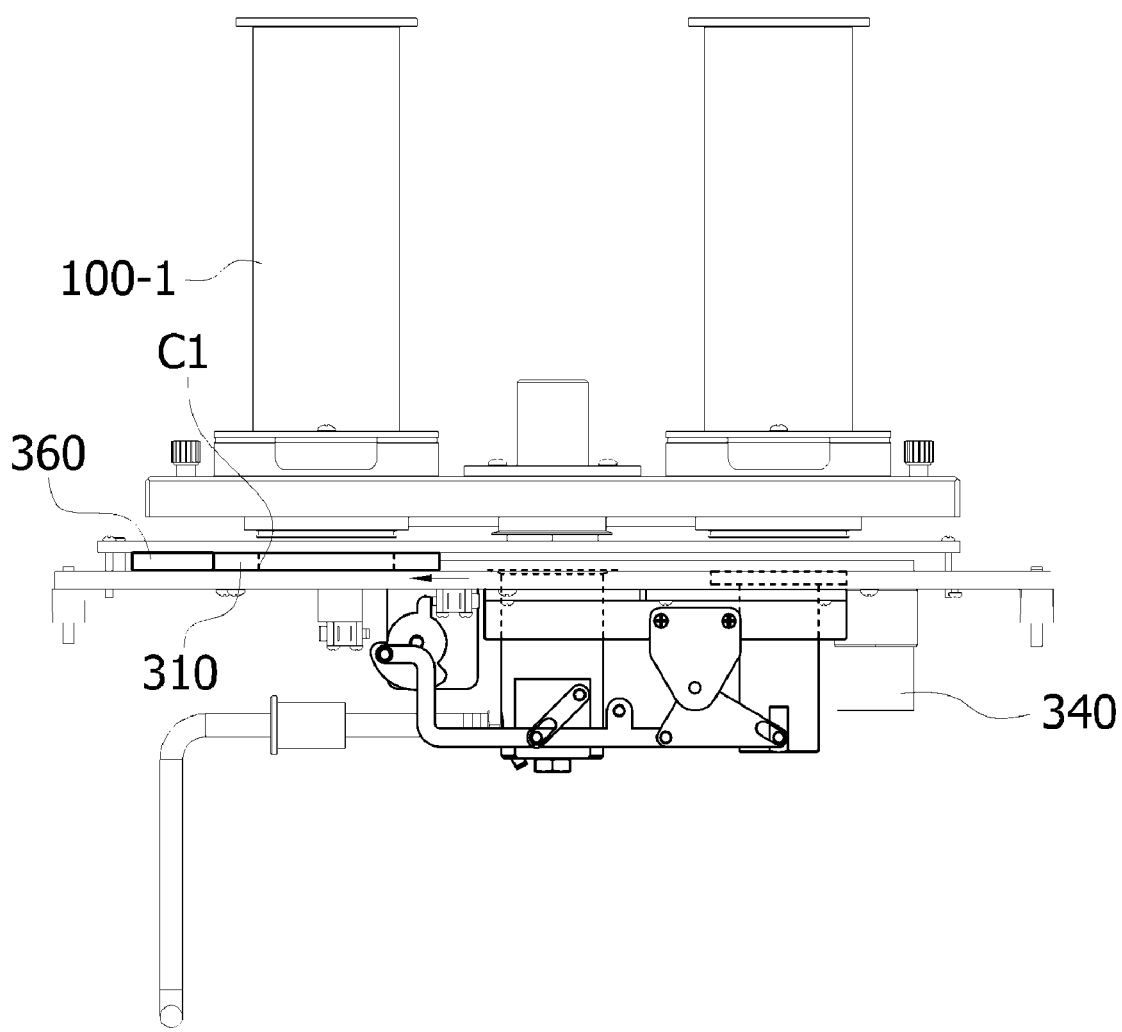

Next, the first motor 340 drives the time belt 320, and then horizontally moves the filter cassette transfer slide 310 toward the lower portion of the first magazine 100-1 (see FIG. 11H).

At this time, the drop prevention part 360 is pushed to one-side end of the pair of the first and second guide rails 331 and 332 by the filter cassette transfer slide 310, and the torsion spring 363 mounted on the lower portion of the drop prevention part 360 is contracted while containing elastic force.

Then, the 'C1' stored in the first magazine 100-1 is dropped and received in the filter cassette transfer slide 310.

Thereafter, processes of FIGS. 11A to 11H are repeatedly performed.

According to the filter cassette magazine in the present invention, it is possible not only to easily transfer a plurality of filter cassette, but also to keeping the filter cassettes blocked from the outside. Therefore, it is possible to prevent the filter cassettes from being contaminated before the filter cassettes are used as samples.

Also, since filter cassettes are dropped as supporting beads for supporting the filter cassettes in a filter cassette magazine are smoothly moved to the outside, the filter cassettes are dropped without any inclination. Therefore, it is possible to prevent damage of the filter cassettes caused by this drop.

An apparatus for gathering fine particles in the present invention is formed to have a structure in which a covering part can be hinged with ease, thereby checking the inside of a horizontal movement means without disassembling of parts of an upper mounting means. Therefore, it is possible to inspect accurately whether or not the apparatus for gathering fine particles are well operated, and to facilitate management and maintenance of the apparatus.

Further, the apparatus further comprises an impact-absorbing bar, so that even if there occurs external impact or bounding of a motor, it is possible to perform stably horizontal movement of a filter cassette transfer slide.

Moreover, it is possible for a location sensing unit to sense accurately where the filter cassettes are located. Therefore, unlike the prior art, the present invention has advantages in that when there occurs some defects or failure in the apparatus for sequentially gathering fine particles, it is unnecessary to disassemble parts in the apparatus so as to identify the location of the filter cassette transfer slide through inner inspection.

Furthermore, by sensing the location of the filter cassette transfer slide, it is possible to control precisely movement of the filter cassette transfer slide, and to place accurately the filter cassettes on a corresponding location.

Furthermore, filter cassettes for gathering fine particles are designed to be transferred by one, so that it is possible to avoid consumption of all samples for two days even if there occurs malfunction.

Additionally, since a lifting means for lifting a lower filter holder and a push rod is formed to have a simple structure, it is possible to provide reduction in parts and costs required for manufacturing, and prevention of frequent malfunction.

As described above, although the preferable embodiments of the present invention have been shown and described, it will be appreciated by those skilled in the art that substitutions, modifications and variations may be made in these embodiments without departing from the principles and spirit of the general inventive concept, the scope of which is defined in the appended claims and their equivalents.

What is claimed is:

1. A filter cassette magazine for receiving filter cassettes which gather fine particles comprising:
  a body part for storing the filter cassettes;
  a lid insertion-coupled to an upper end of the body part;
  a filter cassette holding part having a first stopping projection which is formed on an inner peripheral surface of an upper end thereof in such a manner that the lower end of the body part is inserted and coupled thereto, a plurality of through holes formed on a lower end thereof, and supporting beads inserted into the through holes, the supporting beads supporting the filter cassettes;
  a bearing formed on an outer peripheral surface of the lower end of the filter cassettes where the through holes are formed; and
  a mounting part having a second stopping projection formed on an inner peripheral surface thereof so as to seat the bearing, and a stopping part formed on an outer peripheral surface thereof due to step, the mounting part being coupled to be moved up and down in the lower end of the filter cassette holding part.

2. The filter cassette magazine of claim 1, wherein the through holes of the filter cassette holding part are formed in a cross direction.

3. The filter cassette magazine of claim 1, wherein the bearing has a lower end formed to be inclined upwardly to the inside thereof.

4. The filter cassette magazine of claim 1, wherein, when the mounting part is moved upwardly, the bearing seated in the second stopping projection is lifted along a first space formed between the mounting part and the filter cassette holding part, the supporting beads are pushed toward a second space formed between the mounting part and the through holes, and then the filter cassettes are dropped due to upward movement of the mounting part.

5. The filter cassette magazine of claim 3, wherein, when the filter cassette is pushed from the lower portion of the magazine and stored into the magazine, the filter cassette pushed up toward the inside of the magazine pushes the supporting beads to the outside of the through holes while the bearing is lifted to the first space formed between the mounting part and the filter cassette holding part, and the bearing is lowered from the first space while pushing the supporting beads toward the inside of the through holes again and thus the filter cassettes are supported and stored by the supporting beads when the filter cassettes are lifted after passing by the through holes.

6. An apparatus for sequentially gathering fine particles comprising:
   a first magazine for storing a filter cassette not having gathered fine particles yet;
   a second magazine for storing a filter cassette having gathered fine particles;
   an upper mounting means formed with a first mounting groove and a second mounting groove which mount each of the first magazine and the second magazine, and a covering part on which an upper filter holder is mounted, the upper filter holder being interposed between the first mounting groove and the second mounting groove and gathering fine particles from the outside;
   a horizontal transfer means formed at a lower portion of the upper mounting means, the horizontal transfer means receiving the 'filter cassette not having gathered fine particles' from the first magazine and horizontally moving the received filter cassette to the upper filter holder so as to gather fine particles, and horizontally moving the 'filter cassette having gathered fine particles' to a lower portion of the second magazine; and
   a vertical transfer means formed at a lower portion of the horizontal transfer means, the vertical transfer means pushing up the 'filter cassette not having gathered fine particles,' which has been horizontally moved to the upper filter holder, in such a manner to come into close contact with the upper filter holder, and pushing up and charging the 'filter cassette having gathered fine particles,' which has been horizontally moved to the lower portion of the second magazine, into the second magazine,
   wherein the first magazine or the second magazine corresponds to the magazine defined in claim 1.

7. The apparatus of claim 6, wherein the first mounting groove and the second mounting groove are additionally formed with magazine mounting-releasing buttons used for mounting and releasing the first magazine and the second magazine, respectively.

8. The apparatus of claim 6, wherein the first mounting groove comprises:
   a first-1 mounting stopping projection for seating a stopping part of the mounting part of the first magazine; and
   a first-2 mounting stopping projection formed to be spaced downwardly apart from the first-1 mounting stopping projection, and seating the lower end of the first magazine.

9. The apparatus of claim 6, wherein the second mounting groove comprises a second mounting stopping projection for seating the stopping part of the mounting part of the second magazine.

10. The apparatus of claim 6, wherein the upper mounting means further comprises a base which is coupled to the lower portion of the covering part such that the covering part can be hinged.

11. The apparatus of claim 10, wherein the covering part has one side coupled to the base by the hinged tightening bolts, and the other side fixedly coupled to the base through a hinge.

12. The apparatus of claim 10, wherein the center of the base is provided with a space part along which a seating frame is formed so that the covering part can be seated on the base.

13. The apparatus of claim 6, wherein the horizontal transfer means comprises:
   a filter cassette transfer slide for receiving the 'filter cassette not having gathered fine particles' from the first magazine and transferring the received filter cassette to a lower portion of the upper filter holder, and transferring the 'filter cassette with the gathered fine particles' to a lower portion of the second magazine;
   a time belt for horizontally moving the filter cassette transfer slide;
   first and second guide rails for guiding horizontal movement of the filter cassette transfer slide in both sides of the filter cassette transfer slide; and
   a first motor for driving the time belt.

14. The apparatus of claim 13, wherein the horizontal transfer means further comprises a location sensing unit for sensing where the filter cassette transfer slide is located.

15. The apparatus of claim 14, wherein the horizontal transfer means identifies a location of the filter cassette transfer slide, and controls precise movement while moving the filter cassette transfer slide in right and left so that the 'filter cassette not having gathered fine particles' are accurately located at a lower portion of the upper filter holder.

16. The apparatus of claim 13, wherein the horizontal transfer means further comprises a drop prevention part which prevents other 'filter cassette not having gathered fine particles,' which have been stored in the first magazine, from being dropped, when the filter cassette transfer slide receives the 'filter cassette not having gathered fine particles' from the first magazine and then transfers the received filter cassette to a lower portion of the upper filter holder.

17. The apparatus of claim 16, wherein the horizontal transfer means further comprises a torsion spring which provides elastic force such that the drop prevention part is moved to the lower portion of the first magazine, when the filter cassette transfer slide receives the 'filter cassette not having gathered fine particles' from the first magazine and transfers the received filter cassette to the lower portion of the upper filter holder.

18. The apparatus of claim 16, wherein each of the filter cassette transfer slide and the drop prevention part is formed with a pair of guide grooves which are coupled to the first guide rail and the second guide rail so as to be horizontally moved along the first and second guide rails.

19. The apparatus of claim 13, wherein the horizontal transfer means further comprises an impact-absorbing bar which is formed above the first and second guide rails in such a manner to be parallel to the first and second guide rails with respect to the filter cassette transfer slide interposed therebetween.

20. The apparatus of claim 19, further comprising a fixing means for fixing the both ends of the impact-absorbing bar to the horizontal transfer means, the fixing means being made of a material with elastic force.

21. The apparatus of claim 13, wherein the filter cassette transfer slide has one side fixedly coupled to a belt connection part so as to be connected to the time belt.

22. The apparatus of claim 6, wherein the vertical transfer means comprises:
- a lower filter holder for pushing up the 'filter cassette not having gathered fine particles,' which is positioned at a lower portion of the upper filter holder, in such a manner to come into close contact with the upper filter holder;
- a push rod for pushing up and charging the 'filter cassette having gathered fine particles,' which is positioned at a lower portion of the second magazine, into the second magazine;
- a lifting means for lifting the lower filter holder and the push rod; and
- a second motor for driving the lifting means,
- wherein the second motor is mounted on one surface of a motor mounting part formed at a lower surface of the horizontal transfer means.

23. The apparatus of claim 22, wherein the horizontal transfer means has a guide groove formed at the center thereof so as to guide horizontal movement of the 'filter cassette not having gathered fine particles' in a longitudinal direction.

24. The apparatus of claim 23, wherein the horizontal transfer means further comprises:
- a lower filter holder lifting hole through which the lower filter holder is inserted so as to be lifted toward the upper filter holder through the horizontal transfer means; and
- a push rod lifting hole through which the push rod is inserted to be lifted toward the second magazine through the horizontal transfer means.

25. The apparatus of claim 24, wherein the horizontal transfer means further comprises an indent step groove which is formed on an upper surface of the horizontal transfer means through an indentation-step process so that the lower filter holder lifting hole and the push rod lifting hole can be contained.

26. The apparatus of claim 25, wherein the indent step groove is formed on an extension of the guide groove, and has a depth lower than that of the guide groove.

27. The apparatus of claim 22, wherein the vertical transfer means is mounted on a lower surface of the horizontal transfer means, and further comprises a bracket which has a first insertion hole through which the lower filter holder is inserted in the lower portion of the horizontal transfer means so as to provide a lifting path, and a second insertion hole through which the push rod is inserted in the lower portion of the horizontal transfer means so as to provide a lifting path.

28. The apparatus of claim 27, wherein the lifting means comprises:
- a rotary member connected to the second motor on the other surface of the motor mounting part, the rotary rotating while being driven by the second motor;
- a pair of translation members connected to the rotary member in such a manner to change the rotation movement of the rotary member into the translation movement, the translation members being formed to be parallel to each other with respect to the lower filter holder interposed therebetween;
- a pair of first lifting members, each of which has one end connected to each of the translation members and the other end connected to the lower filter holder, the first lifting member lifting the lower filter holder according to the translation movement of the translation members; and
- a pair of second lifting members, each of which has one side connected to each of the translation members, another side connected to the bracket, and the other side connected to the push rod, the second lifting member lifting the push rod according to the translation movement of the translation members.

29. The apparatus of claim 28, wherein the vertical transfer means is formed on the lower surface of the horizontal transfer means, and further comprises first and second switches for generating a predetermined signal so as to identify a lifting state of the lower filter holder and the push rod.

30. The apparatus of claim 29, wherein the rotary member comprises:
- a hitting protrusion which hits buttons of the first and second switches to thereby generate the predetermined signal, as the rotary member rotates; and
- a connection part formed on side surface of the rotary member, the connection part being used for connection of the pair of the translation members.

31. The apparatus of claim 30, wherein each of the translation members comprises:
- a first horizontal part connected to the rotary member through the connection part, the first horizontal part extending in a longitudinal direction of the horizontal transfer means;
- a vertical part extending to be downwardly vertical to the first horizontal part; and
- a second horizontal part extending in a longitudinal direction of the first horizontal part from the vertical part.

32. The apparatus of claim 31, wherein the second horizontal part has one-side surface where a first connection protrusion is outwardly protruded for connection of the first lifting members.

33. The apparatus of claim 32, wherein each of the first lifting members has one end where a first moving hole is formed and the other end where a connection hole is formed, the first moving hole being engaged with the first connection protrusion so as to be movable in right and left, and the connection hole being connected to the lower filter holder, and the lower filter holder has both sides where a second connection protrusion is protruded, the second connection protrusion being inserted into the connection hole to be connected to the first lifting member.

34. The apparatus of claim 33, wherein each of the first lifting members is formed to be inclined upwardly between the pair of the translation members and the lower filter holder.

35. The apparatus of claim 28, wherein each of the second lifting members lifts the push rod while rotating about a position connected to the bracket.

36. The apparatus of claim 28, wherein the push rod has both sides where a third connection protrusion is formed so as to be connected to the pair of the second lifting members, and the second lifting member has the other side where a second moving hole is formed, the second moving hole being engaged with the third connection protrusion so as to be movable in right and left.

* * * * *